United States Patent
Petty et al.

(10) Patent No.: US 7,075,661 B2
(45) Date of Patent: Jul. 11, 2006

(54) APPARATUS AND METHOD FOR OBTAINING THREE-DIMENSIONAL POSITIONAL DATA FROM A TWO-DIMENSIONAL CAPTURED IMAGE

(75) Inventors: John Michael Petty, Sheffield (GB); Phillip Stephen Petty, Sheffield (GB)

(73) Assignee: Industrial Control Systems Limited, Sheffield (GB)

( * ) Notice: Subject to any disclaimer, the term of this patent is extended or adjusted under 35 U.S.C. 154(b) by 113 days.

(21) Appl. No.: 10/468,953

(22) PCT Filed: Feb. 22, 2002

(86) PCT No.: PCT/GB02/00738

§ 371 (c)(1),
(2), (4) Date: Aug. 22, 2003

(87) PCT Pub. No.: WO02/068987

PCT Pub. Date: Sep. 6, 2002

(65) Prior Publication Data

US 2004/0128102 A1 Jul. 1, 2004

(51) Int. Cl.
*G01B 11/24* (2006.01)
*G06K 9/00* (2006.01)
*G03B 13/00* (2006.01)

(52) U.S. Cl. ............... 356/603; 356/604; 356/610; 356/616; 356/620; 382/111; 396/106; 396/431; 396/50

(58) Field of Classification Search ........ 356/600–625; 250/559.22, 559.05; 382/111, 321, 779; 396/106, 431, 50; 438/774, 761, 766, 239, 438/207.09
See application file for complete search history.

(56) References Cited

U.S. PATENT DOCUMENTS

| 4,672,562 A | 6/1987 | Egli et al. |
| 4,776,027 A * | 10/1988 | Hisano et al. ............... 382/288 |
| 4,914,460 A | 4/1990 | Caimi et al. |
| 5,135,308 A * | 8/1992 | Kuchel ........................ 356/604 |
| 5,175,601 A * | 12/1992 | Fitts ........................... 356/604 |

(Continued)

FOREIGN PATENT DOCUMENTS

EP  0 205 175 A  12/1986

(Continued)

OTHER PUBLICATIONS

International Search Report—PCT/GB02/00738; ISA/EPO, Completed: Jun. 26, 2002.

*Primary Examiner*—Gregory J. Toatley, Jr.
*Assistant Examiner*—Sang H. Nguyen
(74) *Attorney, Agent, or Firm*—Harness, Dickey & Pierce, P.L.L.C.

(57) ABSTRACT

Methods and apparatus for introducing a plurality of optical markers to a field of view, capturing a two-dimensional image of said field of view on an image plate comprising a pixel array, determining a set of marker origin offset values and using said offset values to establish a set of orientation values describing the relationship between the field of view and the image plate are disclosed. These orientation values are used to relate the area of image captured by each pixel in the image plate to the real world. By applying projective geometry, vector analysis and trigonometrical surveys an image analysis is conducted to establish a three-dimensional positional data set describing the three-dimensional position of regions of reflectivity in the captured two-dimensional image. From this data set a three-dimensional model of the field of view can be reconstructed.

42 Claims, 28 Drawing Sheets

U.S. PATENT DOCUMENTS

| | | | |
|---|---|---|---|
| 5,227,985 A | 7/1993 | DeMenthon | |
| 5,245,177 A * | 9/1993 | Schiller | 250/221 |
| 5,307,151 A * | 4/1994 | Hof et al. | 356/604 |
| 5,317,388 A | 5/1994 | Surka et al. | |
| 5,402,364 A * | 3/1995 | Kitoh et al. | 702/167 |
| 5,753,931 A * | 5/1998 | Borchers et al. | 250/559.22 |
| 5,838,428 A * | 11/1998 | Pipitone et al. | 356/3.09 |
| 6,133,951 A * | 10/2000 | Miyadera | 348/220.1 |
| 6,516,151 B1 * | 2/2003 | Pilu | 396/106 |
| 6,609,797 B1 * | 8/2003 | Ejiri et al. | 353/69 |
| 6,741,279 B1 * | 5/2004 | Allen | 348/239 |

FOREIGN PATENT DOCUMENTS

| | | |
|---|---|---|
| EP | 0 385 528 A | 9/1990 |
| EP | 0 974 811 A | 1/2000 |

* cited by examiner

Table 1

| Laser Specification | |
|---|---|
| Laser wavelength (nm) | 635 - 650 ± 2 |
| Beam divergence (mrad) | 0.5 |
| Mechanical optical axis (mrad) | ≤ 0.25 |

Fig. 12

Table 2

| | |
|---|---|
| | Sample Camera Manufacturer's Information |
| Model | Digital Camber Fuji™ DX10 |
| Sensor Array | 1/3 inch CCD square pixel array, full read format |
| Image Quality | 1,024 x 768 pixels/640 x 480 pixels |
| File Format | JPEG |
| Lens | Fujinon™ fixed-focus F4/F8 |
| Focal Length | f = 5.5mm |

Table 3

| Known Data | Obtainable data |
|---|---|
| Focal Length | x, z pixel size, x, y, z origin offsets |
| x, y, z, origin offsets, distance from centre of image plate to striking plane (Yg) | Focal length, x, z pixel size |
| Image plate aperture view angle | x, z pixel size, x, y, z origin offsets, focal length |

Fig. 28

APPARATUS AND METHOD FOR OBTAINING THREE-DIMENSIONAL POSITIONAL DATA FROM A TWO-DIMENSIONAL CAPTURED IMAGE

CROSS-REFERENCE TO RELATED APPLICATIONS

This application is a US National Stage of International Application No. PCT/GB02/00738 filed 22 Feb. 2002. This application claims the benefit of Great Britain Application No. 0104456.9 filed 23 Feb. 2001. The disclosure(s) of the above applications are incorporated herein by reference.

FIELD OF THE INVENTION

The present invention relates to apparatus and methods for determining one, two and three-dimensional positional data from a two-dimensional image and particularly, although not exclusively, to apparatus and methods for determining three-dimensional positional data from a two-dimensional captured image of a field of view comprising at least two optical markers.

BACKGROUND TO THE INVENTION

Prior art cameras incorporate a light-sensitive media in the form of an insertable film on which the image captured by the camera is formed. As a general rule, the larger the film format, the finer the quality of image. Such films use a chemical process to form the image, the image being fixed onto a hard copy format e.g. paper. Such films produce an image as a gradient, the image not being formed by a number of identifiable and measurable image quanta. From this traditional chemical film format, semi-conductor arrays have been developed for capturing images via the sensing of light and production of a plurality of digitised signals. Examples of such digital image plates known in the prior art are the CCD (Charged Couple Device) and CMOS (Complementary MOS) arrays.

CCD and CMOS arrays comprise a plurality of photo-sensitive elements which each generate a pixel of data. Each pixel of data is then combined with adjacent pixels of data to produce an image of the entire field of view. Each pixel therefore has a pixel size of measurable physical dimensions which can be determined. These physical dimensions can be related to known positions in the field of view.

Prior art devices and methods have taken advantage of the CCD array to accurately measure distances between a digital camera and objects in a field of view. This type of range finding is illustrated in the following prior art documents: GB 2344012, EP 0205175, DE 4238891, JP 07294216, JP 08005370, JP 08094324, JP 09304055, DE 19736588, DE 29921143 U1, DE 19949838, JP 08285633, JP 11094520, JP 2000121354, U.S. Pat. No. 6,094,270. These prior art references are concerned with measuring distances from an object to an image plate or lens including methods of eliminating information of low reliability.

In these prior art documents it is apparent that range finding has become possible using CCD image plates and a marker introduced to the field of view. The CCD enables the pixel dimensions to be determined, and determining the characteristics of the markers introduced to the image enables trigonometrical surveys and Pythagoras calculations to obtain the distance from the image plate to the object in view.

EP 0205175 discloses the use of a plurality of cameras to obtain distance information relating a robot arm to an object. Determination of arm position is made as a relative determination between known points and does not provide information for all points in the field of view of one camera. Additionally, a plurality of cameras are required to provide image information in more than two dimensions.

U.S. Pat. No. 6,094,270 is concerned with real time range finding. A sweeping light projection is required and an analysis of reflective light intensity is required to be adjusted to account for changes in reflectance characteristics of a surface dependent on the wavelength of incident light. It is necessary for a sweep of light to traverse the entire field of view to establish positional data about that field of view by a simple range finding to each point swept by the beam of light.

EP 0145957 A1 discloses a method in which the distance between an imaging optic and an object is determined. A light spot is projected onto an object, the light source being apertured to provide a non-diverging light beam wherein the light spot formed on the object is of known diameter and area. The method relies upon initially determining a reference point wherein the light spot strikes the object plane at a normal to the imaging optic. Projecting the light spot at a point of interest on the object results in a distortion of the light spot dependent upon the contour of the object surface. A correction for the distortion between the measured object surface and the normal is obtained by a triangulation method. This method can only correct for one aspect of the orientation of the plane of the imaging plate with respect to the object plane, that is, only a calculation of the change in tilt or pan can be made. The method further requires a pre-initializing or calibration step wherein it is necessary to locate the reference light spot at the centre of the image in order to determine the normal values. It is necessary to further use a non-diverging beam in order to project a light spot of consistent known size. As a pre-initializing step is required before a measurement step more than one imaging operation is required to determine distance information. Further, a plurality of measuring operations are required to determine three-dimensional positional data regarding the object as it is only possible to measure one orientation aspect of the image plate with respect to the object plane at any one time. Further, in order to determine three-dimensional positional data regarding a plurality of surface points of the object it is necessary to scan the imaging optic across the object. This may further combine a displacement of the imaging optic relevant to the object in order to determine the distance between image plate and object plane at any chosen point of interest on the object plane.

EP 0224237 A1 discloses a system for locating an object. The system comprises an approach sensor for optically scanning and a light source for light transmission towards an object comprising several target patterns in the form of pairs of coded patterns which can be read optically. The sensor is capable of receiving light reflected from the target patterns in order to measure functions of time and angle of the sensor from the pairs of patterns so as to locate the object specifically with respect to the sensor. This system is a comparator wherein time and angular displacement measurements are determined in order to determine a relative spatial position of the sensor to the object. No information regarding the three-dimensional position of the object surface plane at a point of interest is provided.

U.S. Pat. No. 5,915,033 relies on a pair of image sensing devices to correct the error in the distance detected in an image detection module including an optical device. The error is expressed as a detected value and is corrected by adding to or subtracting from the detected value. A pair of imaging devices are required.

EP 0974811 discloses a method for a digital camera comprising the determining of an orientation of an object e.g. a document relative to an optical axis of the digital camera. The method comprises determination of the orientation of the imaged object relative to the camera optical axis. Measuring a distortion of a protected pattern of spots enables determination of a planarity of the object. This method is useful for imaging documents. In particular, this method does not enable the determination of a set of orientation values which describes the orientation of the image plate to a plurality of objects in the image.

The method requires capturing of the single object within the field of view and determining a single object—camera orientation.

The prior art teaches that it is not possible to simply introduce a plurality of optical markers into a field of view, that field of view then being captured by an image plate, wherein the said optical markers have known projection characteristics, to obtain three-dimensional positional data about objects and surfaces (being regions of reflectivity) in the field of view by an analysis of the two-dimensional captured image. The present invention solves this technical problem by providing technical apparatus and methods for the determination of one, two and three-dimensional positional data describing the real world position of regions of reflectivity from an analysis of a two-dimensional captured image of a field of view.

SUMMARY OF THE INVENTION

It is an object of the present invention to provide a method for the determination of positional data from a field of view by introducing a plurality of markers into the field of view, capturing an image of the field of view and determining the orientation of the image plate capturing said image with respect to a plurality of regions of reflectivity in the field of view.

It is a further object of the present invention to provide a method for the determination of the orientation of an image plate to a plurality of regions of reflectivity in the field of view.

A further object of the present invention is to determine a set of orientation values describing the orientation of an image plate with respect to a plurality of regions of reflectivity in a field of view being imaged, said orientation values enabling reconstruction of a set of two-dimensional or three-dimensional data describing the position of more than one of said regions of reflectivity.

The inventors have realized that the projection of a plurality of markers having known characteristics enables a two-dimensional image of a field of view, including the projected markers, to be captured such that a trigonometrical survey can be conducted to establish a set of image plate orientation values describing the orientation of the image plate, and subsequently each pixel in a pixel array forming the image plate, with respect to each of the real world regions of reflectivity in the field of view. This provides information about each pixel and the area of the real world field of view captured by the image to which each pixel is associated (the pixels worth). By applying a process of projective geometry, vector analysis and trigonometry to these orientation values one, two and three-dimensional positional data in respect of regions of reflectivity in the field of view can be established.

The inventors have realized that two dimensional photographic images captured on an image plate, said image plate comprising an array of photosensitive elements, each element capable of generating a pixel of data, when combined with at least one marker introduced to the field of view, enables spatial positional data relating to objects and surfaces in the field of view to be determined. In order to obtain this spatial positional data it is necessary to obtain a representation of the image of the field of view on a quantized image plate comprising an array of said elements sensitive to the wavelength of the marker. This is necessary because the determination of spatial positional data from said image is resultant on knowing information about the dimensions and optical characteristics of each pixel.

The inventors have further realized that the introduction of a plurality of optical markers into a field of view, each marker produced by a beam of light or electromagnetic radiation incident on objects or surfaces being regions of reflectivity in said field of view coupled with knowledge of the spatial and angular relationships between said beams and the source or origin of each beam, and further coupled with information relating the position of the image plate on which an image of the field of view and said markers is captured, to the source or origin of each beam, and applying a trigonometrical survey to establish a set of orientation values, enables image analysis of the captured two-dimensional image to produce a set of three-dimensional positional field data describing the three-dimensional position of each region of reflectivity in the field of view.

According to a first specific method of the present invention there is provided a method of obtaining positional data of at least one region of reflectivity contained in a field of view, said field of view containing a plurality of said regions of reflectivity, said method comprising the steps of:

projecting into said field of view at least two detectable markers, each marker produced by incidence of at least one electromagnetic beam on at least one reference plane comprised by said field of view, said reference plane comprising at least one region of reflectivity, said beams having at least one origin; and capturing an image of said field of view and said markers on an image plate, said method characterised by comprising the steps of:

selecting a set of beam configuration characteristics, wherein at least one spatial relationship between at least one of the origins of said beams and said image plate, at image capture, is determined, identifying at least two markers in the captured image; and using said at least one spatial relationship to determine a set of offset values relating said image plate to said origin(s); and using the identification of said markers, said offset values, said selected beam configuration characteristics and trigonometric calculations to determine a set of orientation values describing the orientation of said image plate to: each of selected regions of reflectivity in the field of view, said selected regions of reflectivity not being comprised by said reference plane.

According to a second specific method of the present invention there is provided a method of determining the distance between at least one region of reflectivity contained in a field of view and an image plate, said method characterised by comprising the steps of:

projecting into said field of view at least one detectable marker said marker produced by incidence of at least one electromagnetic beam on at least one reference plane comprised by said field of view, said reference plane comprising at least one region of reflectivity, said beam having at least one origin; and capturing an image of said field of view and said marker on an image plate, said method characterised by comprising the steps of:

selecting a set of beam configuration characteristics, wherein at least one spatial relationship between at least one of the origins of said beam and said image plate, at image capture, is determined, identifying said marker in the captured image; and using said at least one spatial relationship to determine a set of offset values relating said image plate to said origin(s); and using the identification of said marker, said offset values, said selected beam configuration characteristics and trigonometric calculations to determine a set of orientation values describing the orientation of said image plate to each of selected regions of reflectivity in the field of view, said selected regions of reflectivity not being comprised by said reference plane.

According to a third specific method of the present invention there is provided a method of determining a description of the spatial position of real world object points and/or surfaces, said method comprising the steps of:

projecting onto at least one reference plane comprised by the real world at least two optically detectable markers, said markers each comprising a light spot, said markers projected into the real world from at least one origin; and capturing an image of the real world area into which the light spots have been projected on an image plate comprising an array of image detection elements, wherein the position of the image plate and the relative position of the origin(s), at image capture, is determined and, where two or more markers are projected from a common origin, at least one of the angular separation of beams projected from said common origin is also determined, said method characterised by comprising the steps of:

downloading the captured image to a processing means;

identifying at least two markers in the downloaded image; and using the predetermined position of said image plate and origins to calculate a set of offset values describing the position of the image plate to each of said origins at image capture; and using the identification of said markers, said offset values and information describing the position of each origin and/or said angular separations to determine a set of orientation values which describe the orientation of each element in the image plate array to the area of the real world imaged by the respective elements.

According to a fourth specific method of the present invention there is provided a method of processing an image of a field of view to obtain positional data describing the real world position of at least one region of reflectivity contained in the image, said image comprising a representation of a field of view into which at least two detectable markers have been projected, each marker produced by incidence of at least one electromagnetic beam on at least one reference plane in the field of view, said reference plane comprising at least one region of reflectivity in the imaged field of view, said beams having at least one origin, said method characterised by comprising the steps of:

selecting a set of beam configuration characteristics, determining at least one spatial relationship between the origin(s) of said beams and the image plate at image capture; and identifying at least two markers in the captured image; and using said at least one spatial relationship to determine a set of offset values relating said image plate to said origin(s); and using the identification of said markers, said offset values, said selected beam configuration characteristics and trigonometric calculations to determine a set of orientation values describing the orientation of said; image plate to each of selected regions of reflectivity in the field of view, said selected regions of reflectivity not being comprised by said reference plane.

According to a fifth specific method of the present invention there is provided a method of obtaining an image of a field of view for use in obtaining; positional data describing the real world position of at least one region of reflectivity contained in said field of view, wherein said field of view contains a plurality of said regions of reflectivity, said method characterised by comprising the steps of:

projecting into said field of view at least two detectable markers., each marker produced by incidence of at least one electromagnetic beam on at least one reference plane comprised by said field of view, said reference plane comprising at least one region of reflectivity, said beams having at least one origin; and capturing an image of said field of view and said markers on an image plate, wherein said image plate and said origin are arranged in fixed positions relative to each other at image capture, wherein by selecting a set of beam configuration characteristics an analysis of the captured image can be performed comprising the identification of the markers in the image, the determination of a set of offset values relating the image plate to the origin(s) and using the identified markers and offset values, selected beam configuration characteristics and trigonometric calculations to determine a set of orientation values describing the orientation of the image plate to each of selected regions of reflectivity in the field of view, said selected regions of reflectivity not being comprised by said reference plane.

According to one aspect of the present invention there is provided a projection unit for the projection of at least two detectable markers onto a field of view, wherein said markers are capturable as part of an image of said field of view formed on an image plate, said projection unit comprising:

at least one electromagnetic radiation source configured for emission of electromagnetic radiation; and means configured to operate on said electromagnetic radiation to produce at least two electromagnetic beams, each beam having an origin, said beams producing said detectable markers on incidence with a reference plane comprising a region of reflectivity in said field of view; and means to locate an image plate, said means located at a pre-determined position, wherein the angular projection of each beam from the respective origin and the position of said origins within said unit is pre-determined, the spatial relationship between said origins and/or said origins and said means to locate an image plate is thereby also predetermined, wherein said projected beams are configured to project said markers onto said field of view to provide information for the analysis of an image of said field of view and markers captured at said image plate in order to establish a set of orientation values describing the orientation of the image plate, at image capture, to selected regions of reflectivity in said field of view.

According to a further aspect of the present invention there is provided a device for projecting a plurality of markers into a field of view, said markers capturable on an image plate comprising an array of elements each capable of generating a pixel of data, the captured two-dimensional image configured for analysis for the reconstruction of a set of one, two or three-dimensional positional data describing the position of selected regions of reflectivity in said field of view from said captured two-dimensional image, said device comprising:

at least one electromagnetic radiation source configured for emission of electromagnetic radiation; and means configured to operate on said electromagnetic radiation to produce at least one electromagnetic radiation beam, each said beam having an origin, said beams producing said markers on incidence with a reference plane comprising a region of reflectivity in said field of view, wherein an angular relationship between said beams and the position of each said origin is pre-determined, the markers thereby forming a pre-defined pattern in said field of view.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 12 illustrates table 1 comprising a sample laser specification;

FIG. 13 illustrates table 2 listing sample camera manufacturer's information;

FIG. 25 is an example of a screen showing calibration data;

FIG. 28 illustrates table 3 describing sample determinable calibration data.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

In this specification the term region of reflectivity describes and relates to at least one point in real world space, e.g. one or more points, surfaces or regions of an object or objects, which can be described in one, two or three-dimensions and can be detected by an imaging device capable of detecting electromagnetic radiation reflected from the region of reflectivity, a single region of reflectivity imaged by a single imaging element, e.g. a pixel, of an array of said elements forming an image plate.

In this specification the term field of view describes and relates to the region of the world imaged by an image plate.

In this specification the term origin or beam origin used in conjunction with the projection of an electromagnetic beam refers to a definable position at which the beam is formed, focused, diffracted or divided. For example, the origin could be a light source, a lens associated with a light source, or the optical apparatus used to split a single beam into two or more beams.

In this specification three-dimensional positional data includes, but is not limited to, "six-axis" information describing each point in space as having a measurable distance component in the x, y and z axes as well as an angular measurement in each axis.

Figure 1:
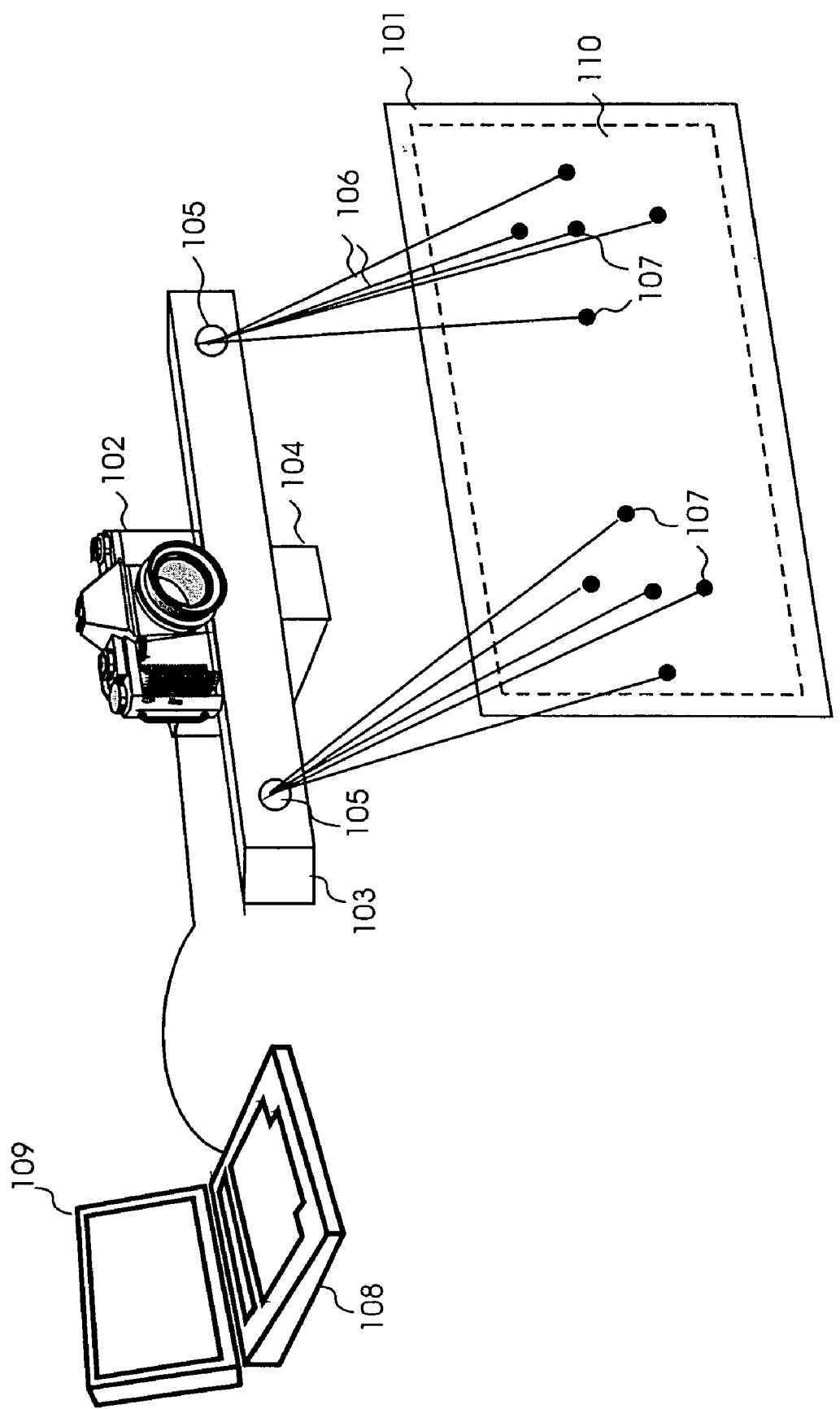
FIG. 1 illustrates a diagrammatic representation of the general arrangement of apparatus used to introduce a plurality of markers to a field of view and to capture a two-dimensional image.

Referring to FIG. 1 there is illustrated a field of view 101 being the area of a scene or landscape viewed/image and capturable by an image plate housed in an optical/imaging device 102, typically a digital camera. The field of view for instance could be a countryside landscape, a building site, products or parts and machinery forming part of a production line, people in a busy high street and generally any objects which can be viewed through an imaging device and a representation captured on an image plate. FIG. 1 illustrates the apparatus required to obtain information for the calculation of three-dimensional positional data of regions of reflectivity within the field of view 101. A mounting means 104 is provided upon which imaging device 102 is engaged in fixed position. One method of engaging imaging device 102 upon the mounting means 104 is to make use of the tripod mounting on a digital camera. Mounting means 104 also provides means to locate a projection unit 103. Mounting means 104 is required to locate projection unit 103 and imaging device 102 in fixed, spatial and angular orientation to each other. Mounting means 104 may further be mounted on a tripod or provide for hand held operation of the combined imaging device, mounting means and projection unit 103.

Figure 10:
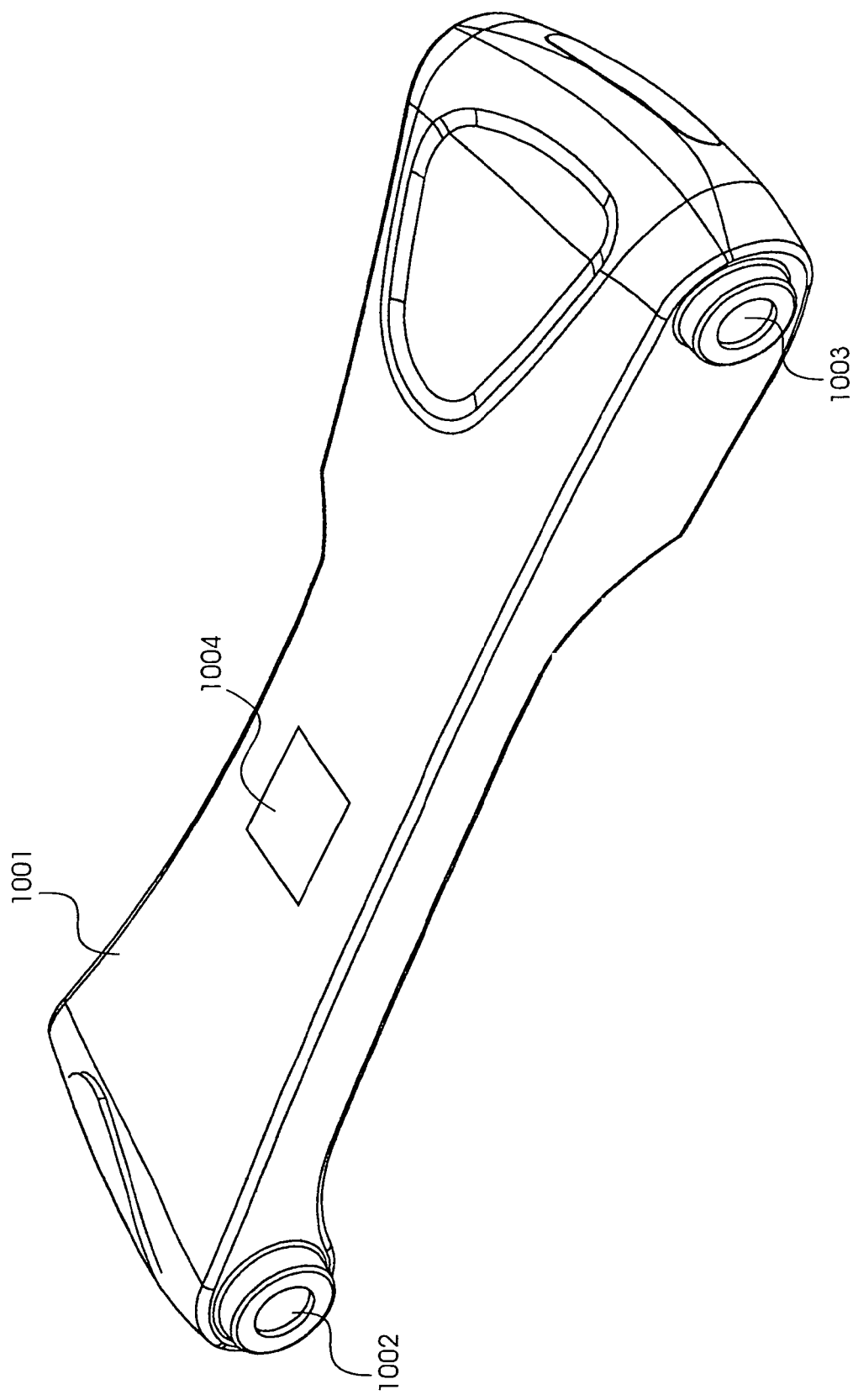
FIG. 10 illustrates an external perspective view of a projection unit in accordance with a first projection unit embodiment.

FIG. 1 illustrates a second projection unit embodiment in a general arrangement wherein the projection unit 103 is formed as a separate item of apparatus mounted at a position of pre-determined relationship to imaging device 102 by a separate mounting means 104. In a first projection unit embodiment (as illustrated in FIG. 10) a single projection unit 1001 provides for projection of optical markers into the field of view and for direct mounting of an imaging device 102 at a specific mounting portion 1004 formed on the body of the projection unit 1001.

The field of view 101 has a striking plane 110 (indicated by a dashed line in FIG. 1). The striking plane 110 can either be an existing substantially planar surface within the field of view e.g. a wall or can be an externally introduced planar surface. For example, when imaging a landscape a planar sheet of material can be introduced to the landscape. Each pattern of markers 107 is projected onto the striking plane.

Ideally, only the markers projected onto the striking plane are analyzed in the orientation process. The striking plane provides a reference plane which can be mathematically defined providing a reference for orientation of the image plate enabling a mathematical transformation of this plane to any other point in the field of view.

Once an image has been captured, e.g. by taking a photograph, on the image plate of imaging device 102, said image comprising the field of view 101, striking plane 110 and optical markers 107, this image is downloaded to a PC or laptop 108 or other processing means where the two-dimensional captured image can be displayed 109 and analysed.

Projection unit 103 comprises at least one light source 105 e.g. a diode laser. Said at least one light source is configured to produce a plurality of beams of light 106. One or more beam splitters may be used. Upon incidence of each beam of light on a region of reflectivity in the field of view an optical marker 107, preferably a light spot is produced. Each light source and beam splitter is maintained at a fixed spatial position within the projection unit. This configures each beam origin to be maintained in a fixed spatial position relative to the imaging device. The beams of light 106 are produced at fixed angular relationships to produce a pre-defined pattern of optical markers in the field of view.

The position of the origin of the light beam is required to be known such that fixed angular and spatial relationships can be calculated. Provided that the position of the light source itself and any lens means provided to focus the light beam are fixed, the origin can be considered as either the point at which the laser originates or the prism, holographic or collimated, or other lens, or other optical apparatus used to focus or operate on the light beam. That is, provided a plane of origin of the light/electromagnetic radiation beam can be determined, then this position can be considered the origin of the beam having known fixed spatial and angular relationships to any other origins and to the image plate thereby enabling calculation of a set of orientation values and image analysis.

Figure 2A:
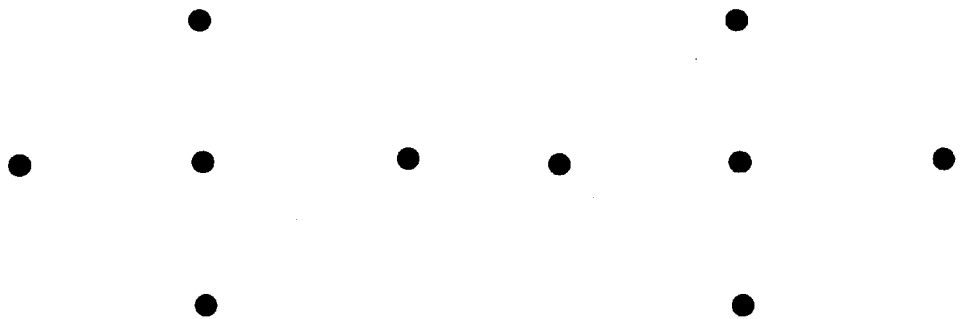
FIG. 2A illustrates a first predefined pattern of optical markers.
Figure 2B:
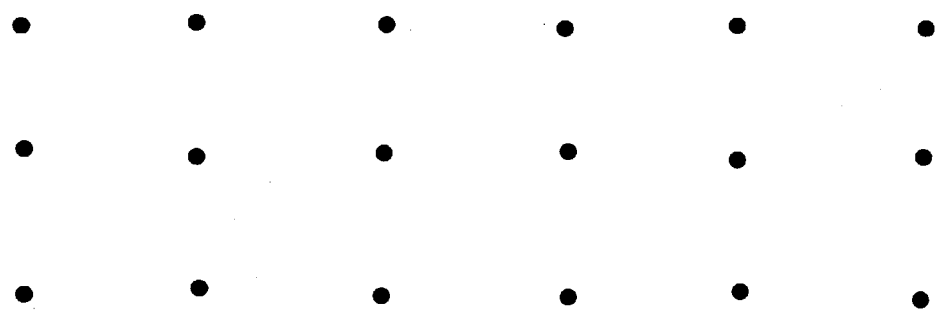
FIG. 2B illustrates a second alternative predefined pattern of optical markers.
Figure 2C:
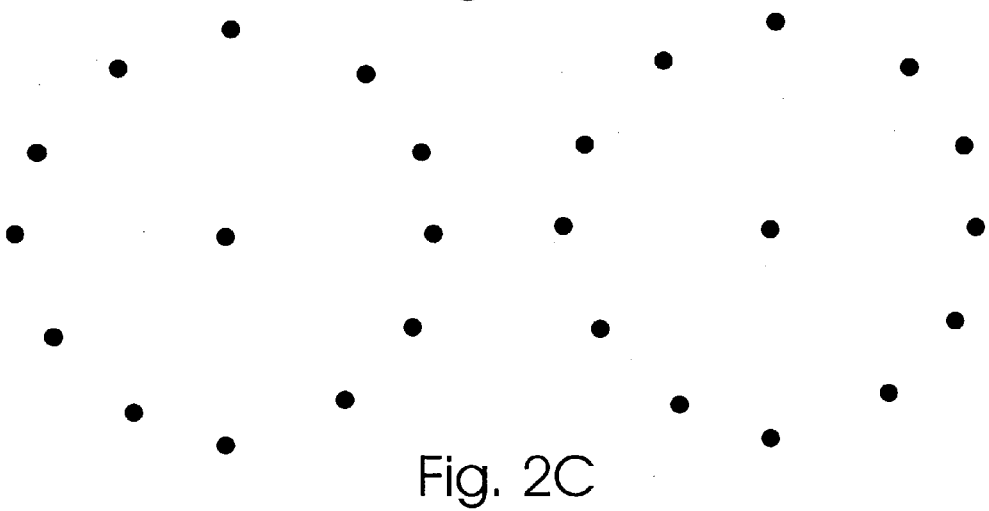
FIG. 2C illustrates a third alternative pre-defined pattern of optical markers.

Examples of three predefined patterns of optical markers are illustrated in FIGS. 2A, B and C. FIG. 2A illustrates two sets of five optical markers, each set forming a cross-shaped pattern of markers wherein each set of markers is produced from a single electromagnetic radiation source. FIG. 2B illustrates two sets of markers, each in the form of a square shaped pattern comprising nine optical markers per set. FIG. 2C illustrates a further alternative configuration of markers. Two sets of markers are illustrated, each in the form of a circular pattern of twelve markers forming the circumference of a circle with an additional marker formed at the centre of the circular pattern. FIGS. 2A, 2B and 2C illustrate two sets of marker, each set produced from a single electromagnetic radiation source. There is no limitation upon the number of sets of markers or number of light sources or beam origins which may be utilised. The invention is not limited by the shape formed by the optical markers but a set of beam configuration characteristics describing the origin positions and/or angular beam separations is required to be known or determined.

In particular, a number of separate collimated light sources can be arranged to produce a single marker each, a multiple arrangement of such light sources together creating a required pattern.

Figure 3A:
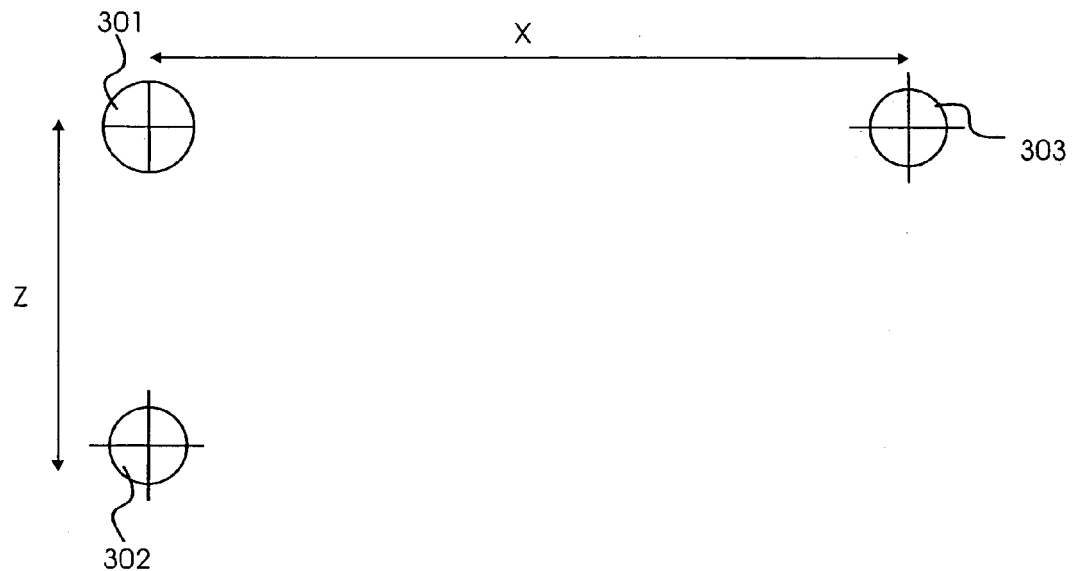
FIG. 3A and FIG. 3B illustrate examples of the minimum marker requirements for determination of image plate orientation in on and off axis arrangement respectively.

The minimum number of markers which are required to be introduced to the field of view in order to calculate the image plate orientation to each of the regions of reflectivity in the field of view is dependent upon the ability to determine the image centre reliably. Referring to FIG. 3A herein, a minimum of two markers are required, a first marker 303 projected from a first origin and second marker 302 projected from a second origin wherein the beam origins are mounted at 90° to each other such that the point of intersection between the markers is located at the centre of the image and therefore the image plate centre 301 formed by the image plate optical axis. In this minimal arrangement, the beams are preferably projected in parallel. In this arrangement, provided the distance from the image plate centre to each beam origin is known (x,z) a set of orientation values can be calculated. The arrangement illustrated in FIG. 3A is referred to as an "on-axis" arrangement.

Figure 3B:
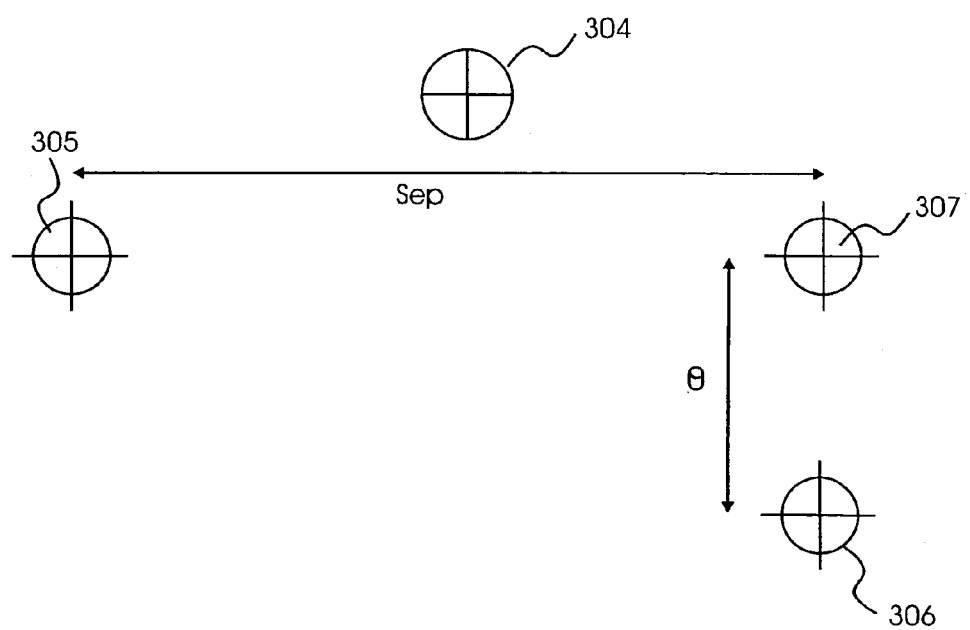

Referring to FIG. 3B herein, where the image plate centre is positioned above, below or between the position of the projected markers in the image (an "off-axis" arrangement), in order to calculate a set of orientation values it is necessary to project a minimum of three markers. FIG. 3B illustrates one off-axis arrangement—an 'L' shaped arrangement—of markers on the striking plane. Further off-axis arrangements can be provided including 't' and 'elongated S' shaped arrangements wherein in each arrangement two markers are projected at a corresponding first height with a third marker projected at a second height. By mounting three beam origins such that three markers are projected, typically in parallel to each other, from beam origins with known or determinable beam configuration characteristics a set of orientation values can be calculated.

In the 'L' arrangement each beam can be projected in parallel from distinct origins positioned at a known angular separation of 90° to each other, wherein as long as the distance between the origin of each beam in the x and z axes and the camera focal distance is known a set of orientation values can be determined.

FIG. 3B illustrates three markers in an 'L' arrangement. In one possible arrangement a first marker 305 is projected from a first beam origin and second markers 306, 307 are projected from a second common beam origin, the image plate centre 304 arranged in an off-axis position. In order to determine a set of orientation values the spatial separation (Sep) between the origin of markers 305, 307 and the angular separation (θ) of the beams producing markers 306, 307 is required to be known. Where markers 306, 307 are produced from beams having distinct origins the angular separation (θ) between origins is required to be known or determined.

Alternatively, in the 't' and 'elongated S' arrangements, the spatial separation (Sep) between the origins of markers at a corresponding first height and at least one angular separation (θ) of the markers, which may be from either common or distinct origins, is required to be known.

Therefore in order to conduct the image analysis to obtain a set of orientation values a set of beam configuration characteristics describing the setup of the projection unit is required to be known or determined. The beam configuration characteristics required depend upon the arrangement of projected markers, but can include one or more of the spatial separation between beam origin(s) and the image plate centre, the spatial separation between beam origins, the angular separation between projected beams and the angular separation between beam origins. The particular beam configuration characteristics required include any combination of these separations.

FIGS. 3A and FIG. 3B illustrate the minimal arrangements for obtaining a full set of orientation values comprising height, pan, tilt, twist. These are minimal arrangements.

In preferred embodiments a plurality of markers are introduced to the field of view from each origin, the markers being projected at pre-determined angular spacings to form either patterns of a type illustrated in FIGS. 2A, 2B and 2C or other predefined marker patterns.

The projection of only a pair of markers in an "off-axis" arrangement provides sufficient information to calculate the tilt or pan, as well as the height and is thereby sufficient to give detailed and accurate two-dimensional positional data of all of the regions of reflectivity in the field of view.

Figure 14:
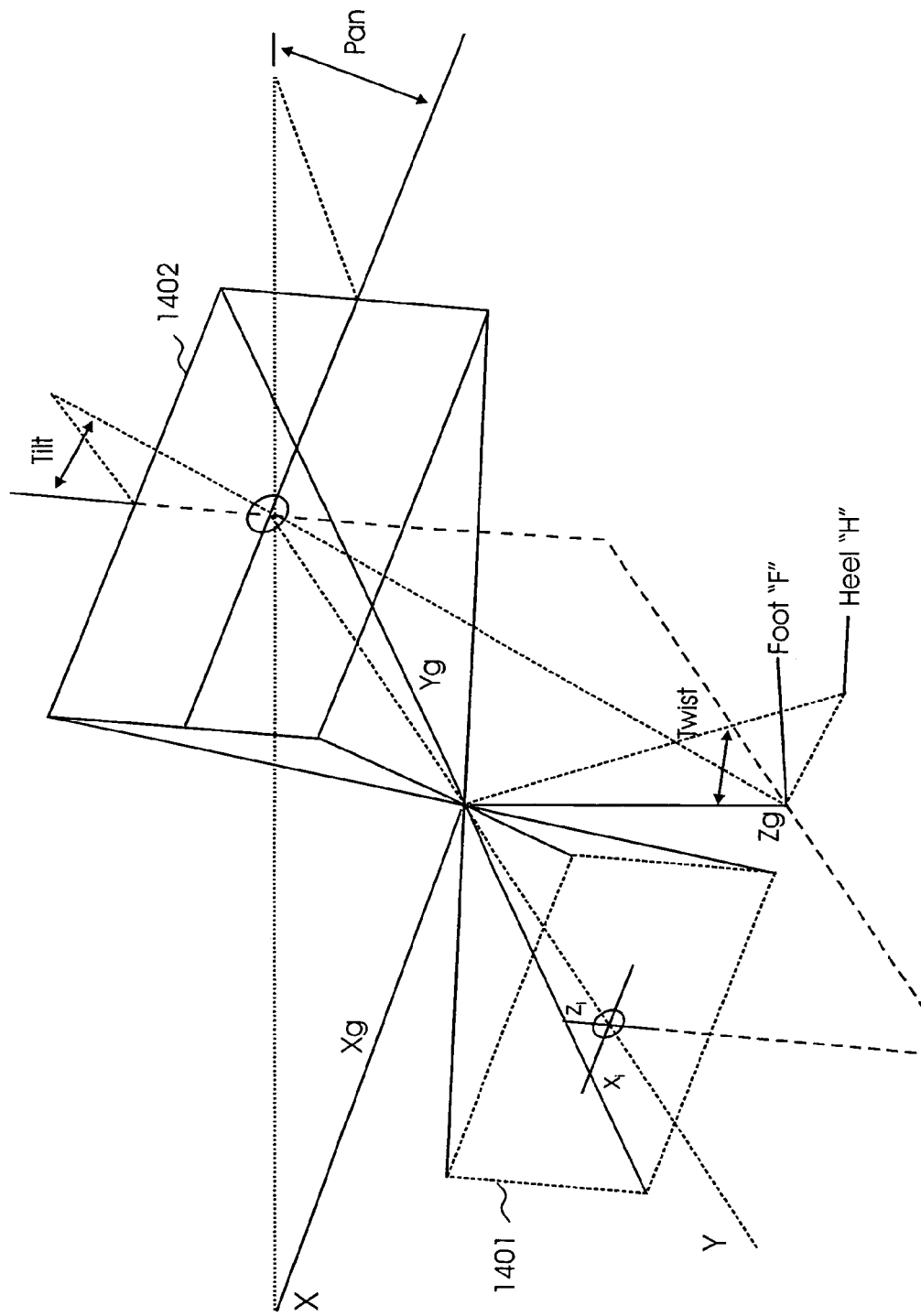
FIG. 14 illustrates the image plate—striking plane relationship and diagrammatically represents tilt, pan and twist.

For example, by determining coefficient M and the y direction centre axis intersection distance ($Y_G$), the distance from the focal point of the image plate to the point at which the x plane intersects the pan angle ($X_G$) can be found. Where coefficient N and $Y_G$ are determined, the distance from the focal point to the point (foot "F") at which the z plane intersects the tilt angle ($Z_G$) can be found. FIG. 14 illustrates the points F, $X_G$ and $Z_G$ and the heel "H" being the distance from the centre axis to the plane along the z axis.

Projecting only a single optical marker provides sufficient information to obtain the orientation value of height of the image plate with respect to each region of reflectivity and thereby provides the distance or range finding function for each region of reflectivity in the field of view. The obtaining of a three dimensional data set includes the determination of height and two-dimensional data.

The box shaped and circle shaped marker patterns illustrated in FIGS. 2B and 2C herein represent non-limiting preferred marker arrangements enabling all of the markers to be identified by implementing an automated search of the image and using an Mx+c best fit solution to reduce errors and increase the sub-pixel marker identification accuracy thereby providing high definition identification of markers in the captured image.

To obtain sufficient data to reconstruct a three-dimensional data set describing the position of regions of reflectivity in a field of view, a minimum of 2 or 3 optical markers are required as described with respect to FIGS. 3A and 3B above. Each marker is produced from a single light beam projected from an origin and incident on a region of reflectivity. A single light source may be split using a graticule or crystal into the requisite number of light beams, the graticule or crystal thus forming the beam origin.

It is possible to create a large single optical marker within the field of view. The resultant distortion of a single large optical marker can in effect be treated as though a plurality of markers are present formed by the differing extent of distortion at the edges of the marker. The use of such a single optical marker is in effect forming a plurality of optical markers which provide information from which a set of orientation values can be established.

In a further marker arrangement at least two beams are projected into the field of view wherein each beam is divergent so as to have the appearance of a line in the field of view. At least two beams are projected, each forming such a line wherein the beams are configured such that the lines overlap. The intensity of reflected light at the point of overlap is greater than the reflected light for the remainder of each line, the point of overlap thus forming the marker for image analysis. In one example of this type of arrangement, four lines are projected into the field of view so as to form a square shape on the striking plane. The corners of the square comprise the overlapping regions of each beam, each overlapping region having a greater signal intensity than the main length of each beam, the overlapping regions thus forming the markers. In a square arrangement, four such markers are thereby provided, in a triangular arrangement of three lines, three markers are thereby provided. Forming markers in this way is useful as it enables use of lower intensity lasers improving the safety of the imaging operation.

Considering the circular configuration of markers illustrated in FIG. 2C projected into a field of view. Distortion of the projected markers in the field of view is a function of the effects of pan, tilt and twist of the image plate with respect to each of the regions of reflectivity in the field of view. Determining these orientation values provides a set of orientation values describing the orientation of the image plate with respect to the regions of reflectivity in the field of view. Image analysis can then be conducted to establish multi-dimensional e.g. two dimensional or three dimensional positional field data.

Use of a larger number of markers in a predetermined pattern allows for the accommodation of anomalies in the reflective response of the striking plane and enables improved accuracy of marker identification.

Figure 4:
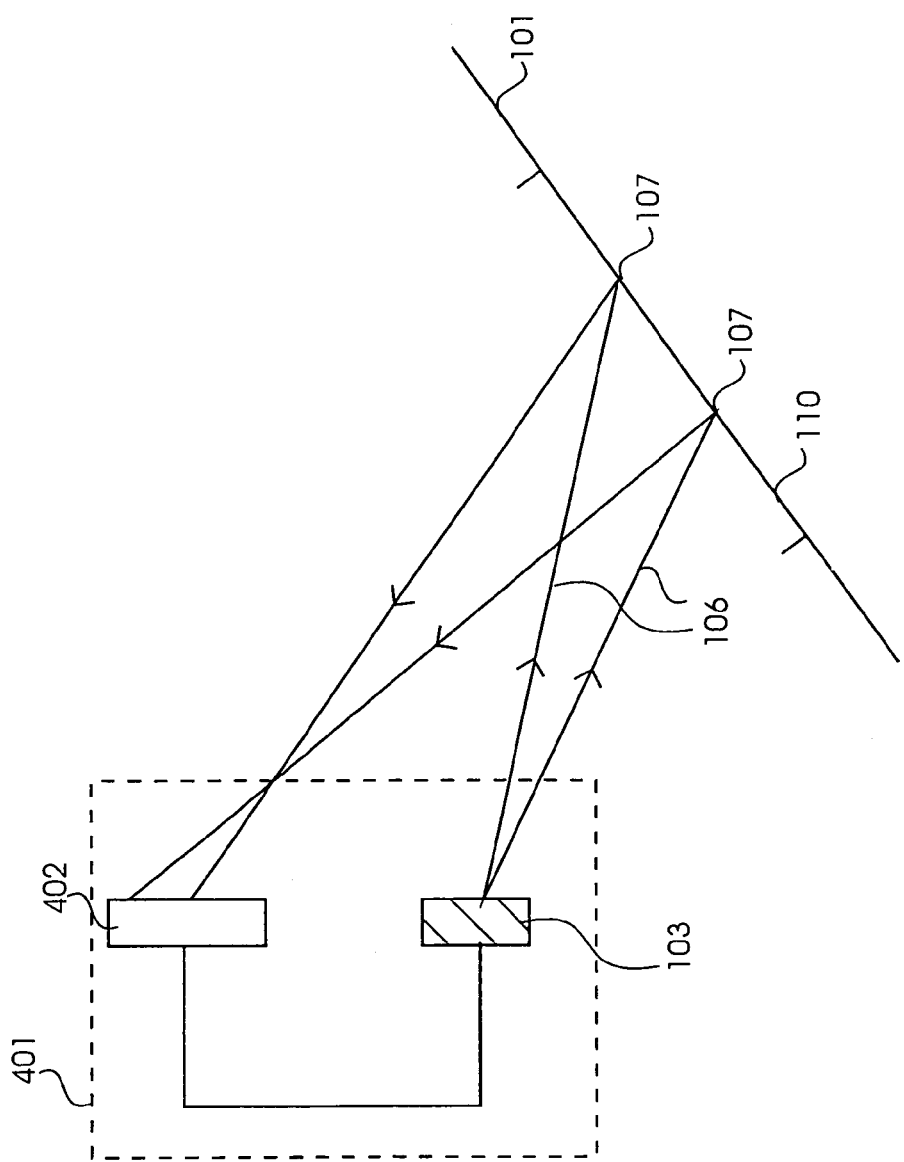
FIG. 4 illustrates a diagrammatic representation of an image plate and projection unit projecting two light beams towards an object surface for the production of optical markers and further illustrates reflection and image capture of the optical markers produced.

FIG. 4 illustrates a combined imaging and projection unit 401 housing an image plate 402 and projection unit 103. FIG. 4 schematically illustrates a representation of the relationship between the image plate and projection unit. Light beams 106 are projected from beam origins within projection unit 103 towards a striking plane 110 in field of view 101 of image plate 402. Regions of reflectivity in the field of view 101 reflect beams 106, reflected beams being captured on image plate 402. Regions of reflectivity within the field of view 101 are not required to be planar and may have dimensions in all 3 x, y and z axes.

In order to obtain three-dimensional positional data which describes regions of reflectivity in a field of view, it is necessary to capture an image of that field of view with appropriate markers on a quantized image plate. Such a quantized image plate may comprise an image plate having an array of photo-sensitive elements, each element capable of generating a pixel of data. Imaging devices such as digital cameras and scanner's and digital video camera's are known which can acquire an image and convert that image to a plurality of digital signals. To do this it is known to form an image plate from a CCD (charged couple device) or CMOS (complimentary MOS) semi-conductor array comprising a plurality of photo-sensitive elements. In such an array each photosensitive element produces a pixel of data by converting reflected light from a field of view into electrical energy. The detected image can be stored in an associated memory, e.g. RAM.

The image plate array can be of any type provided it is an array comprised of materials sensitive to electromagnetic radiation and arranged as an array of individual cells. Importantly, the CCD is a photo-responsive media which has measurable physical dimensions, including x, y and z physical dimensions. An image plate comprised by an array of pixel's therefore forms a two-dimensional image of a field of view which can be divided up into individual pixel's having physical dimensions which can be related to that field of view.

Figure 5:
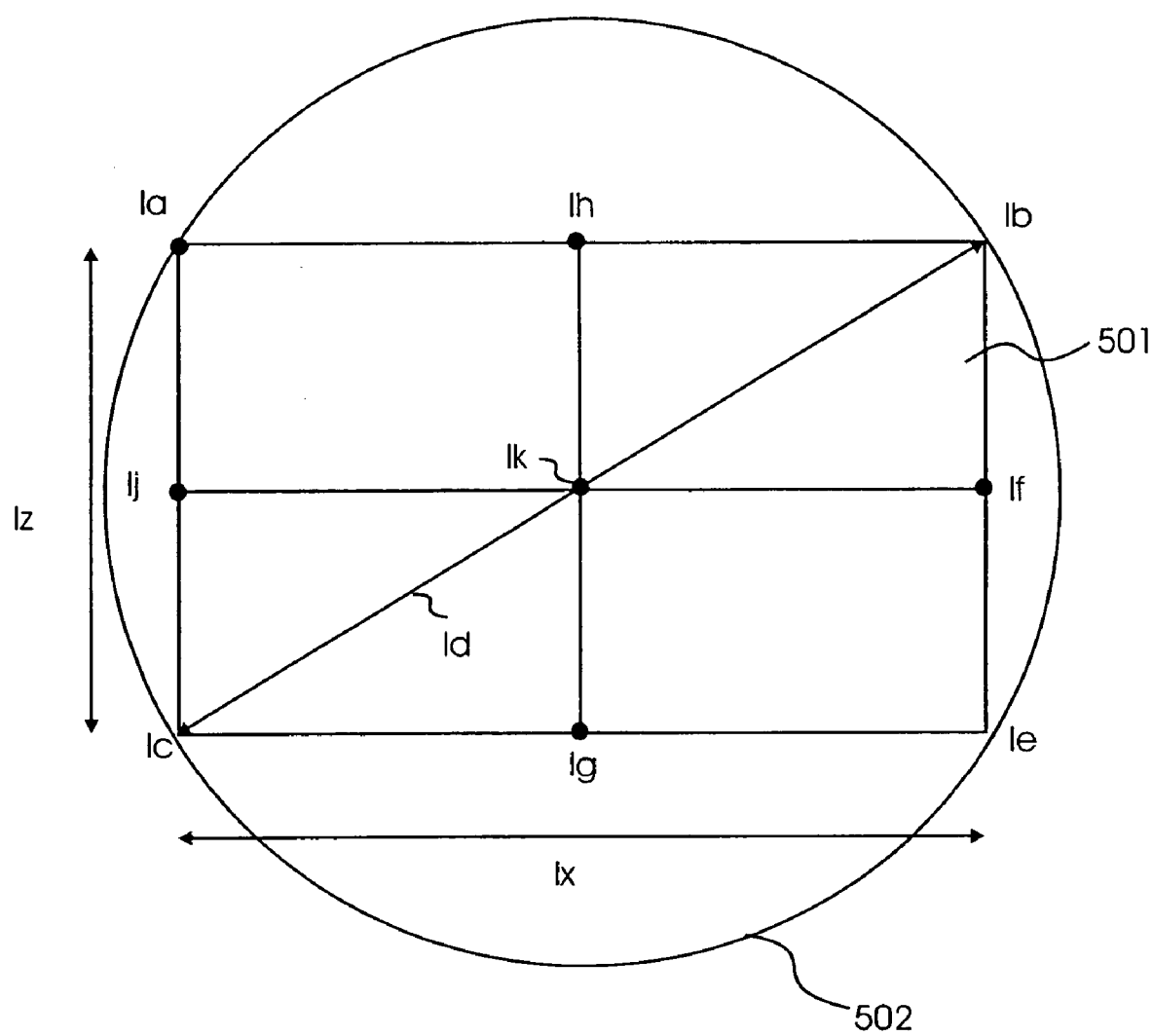
FIG. 5 illustrates a diagrammatic representation of an active image plate.

An imaging device such as a digital camera has a plurality of optical characteristics including focal length, image plate dimensions and pixel dimensions. FIG. 5 illustrates a representation of an image plate 501 having an image plate height (Iz), an image plate width (Ix) and image plate diagonal (Id).

For a 35 mm photo type format the relevant dimensions will be as follows:

Ix=36 mm

Iz=24 mm

Id=43.266615 mm and $$Id=(Ix^2+Iz^2)^{1/2}$$ Equation 1

Figure 6B:
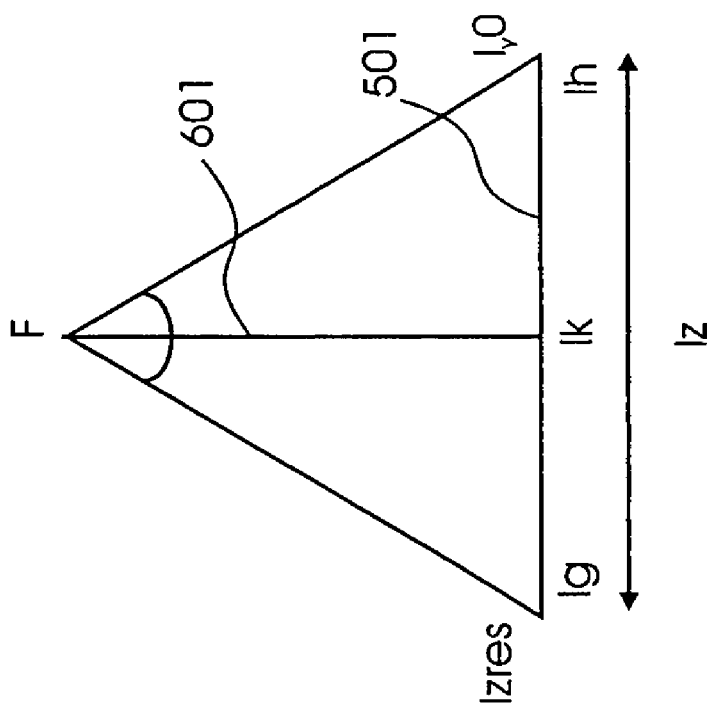
FIG. 6A and FIG. 6B illustrate two-dimensional representations of a virtual cone deriving the x and z pixel angle formed on the central axis between the focal point and a circle encompassing the image plate of an imaging device.
Figure 6A:
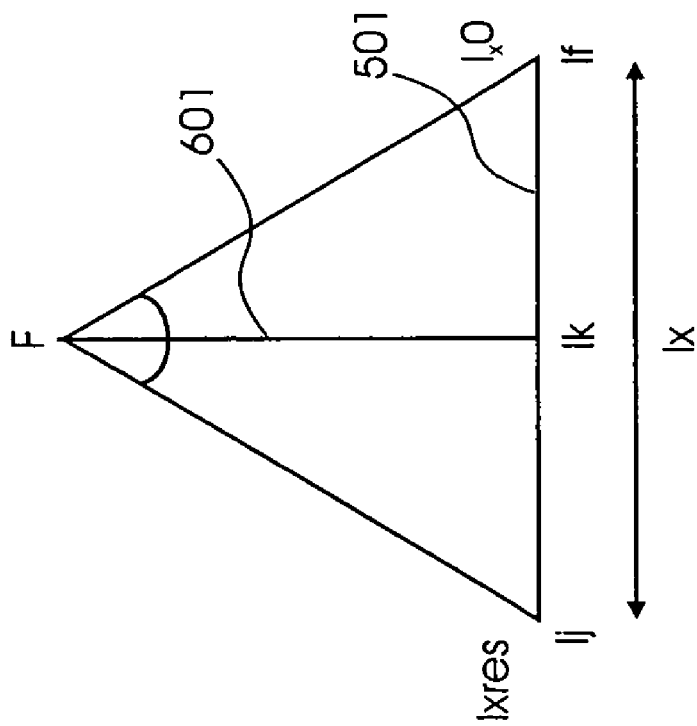

Between the image plate and lens of a camera there is produced a virtual cone with a height equal to the focal length of the camera. FIG. 6A and FIG. 6B illustrate, as planar line drawings, representations of this cone wherein F=the focal point, the vertical distance between the image plate center and the focal point giving the focal length, f, 601.

Figure 7:
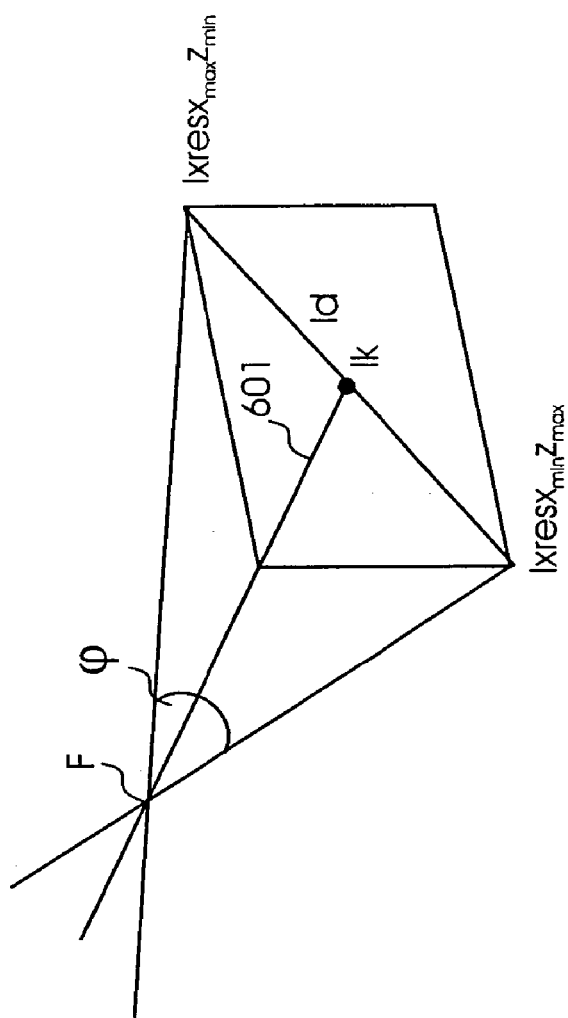
FIG. 7 illustrates a diagrammatic representation of an image plate and focal point.

Another representation of the relationship between view angle and image plate is shown in FIG. 7. The focal point F is located at the lens. Distance 601 between F and the center of the image plate being the focal distance, f, and the angle φ is the view angle. A relationship of the focal length to the angular field of view is given by the angle subtended at the lens with respect to a circle encompassing the image plate 502.

Figure 8:
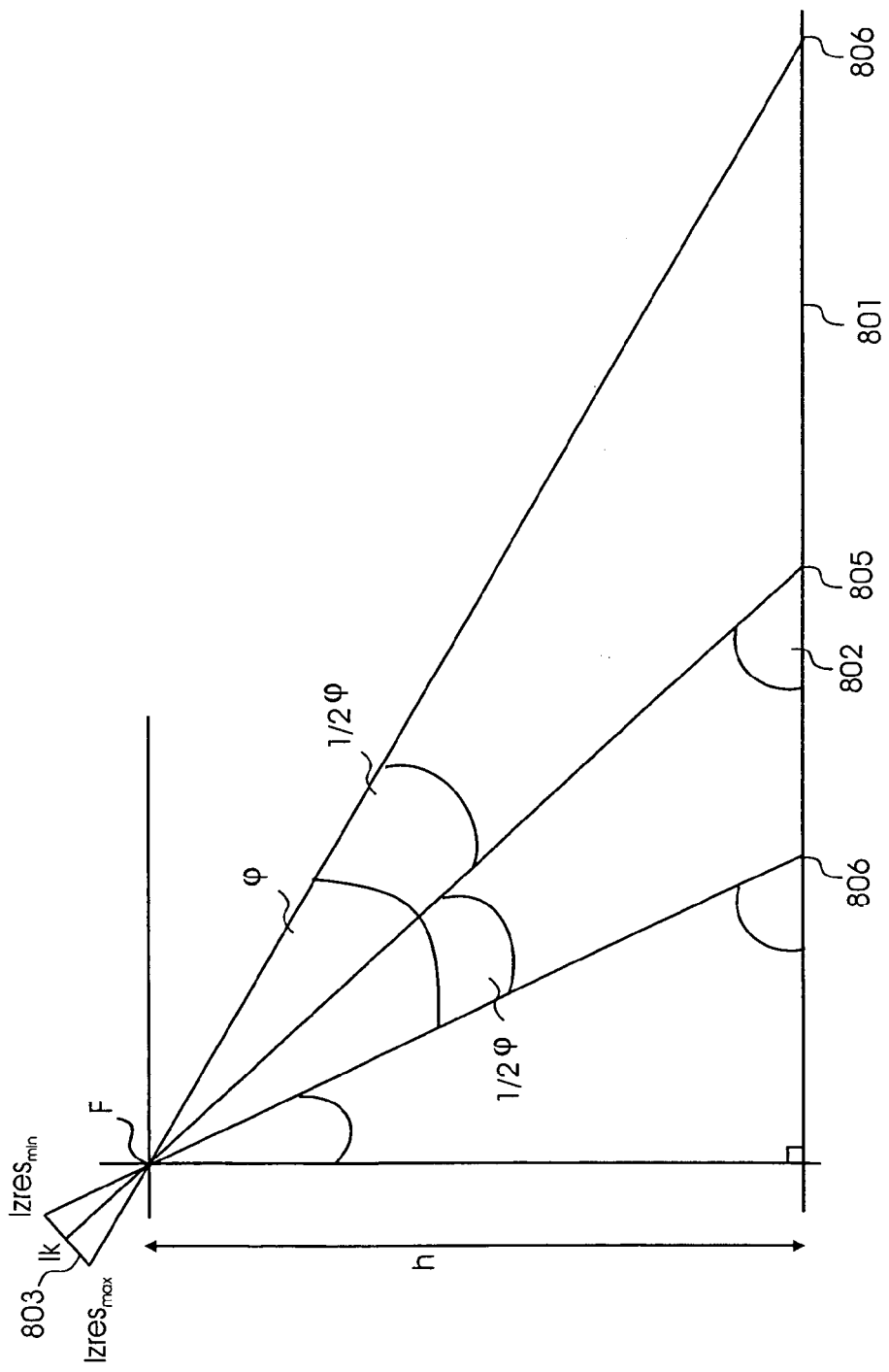
FIG. 8 illustrates a diagrammatic representation of the view angle of the imaging device when tilted.

FIG. 8 illustrates the limit of the field of view which is determined by the angle of view φ. The limit of the field of view 806 is bisected by the center axis 805 of the image plate 803. A tilt angle 802 is defined between the center axis 805 and the striking plane 801. The field of view includes the striking plane 801 and the distance between the center of the image plate and the striking plane 801 is given by the height, h. If the physical dimensions of each pixel in the image plate are measured and the angular orientation of the image plate is known, each pixel can then be transposed to/from a reference plane, the striking plane, and each pixel row in the y plane of the image plate will then correspond to the position of the y co-ordinate of the image in the real world. In this way it is possible to determine the co-ordinates of optical markers 107 which are introduced to the field of view.

Figure 9:
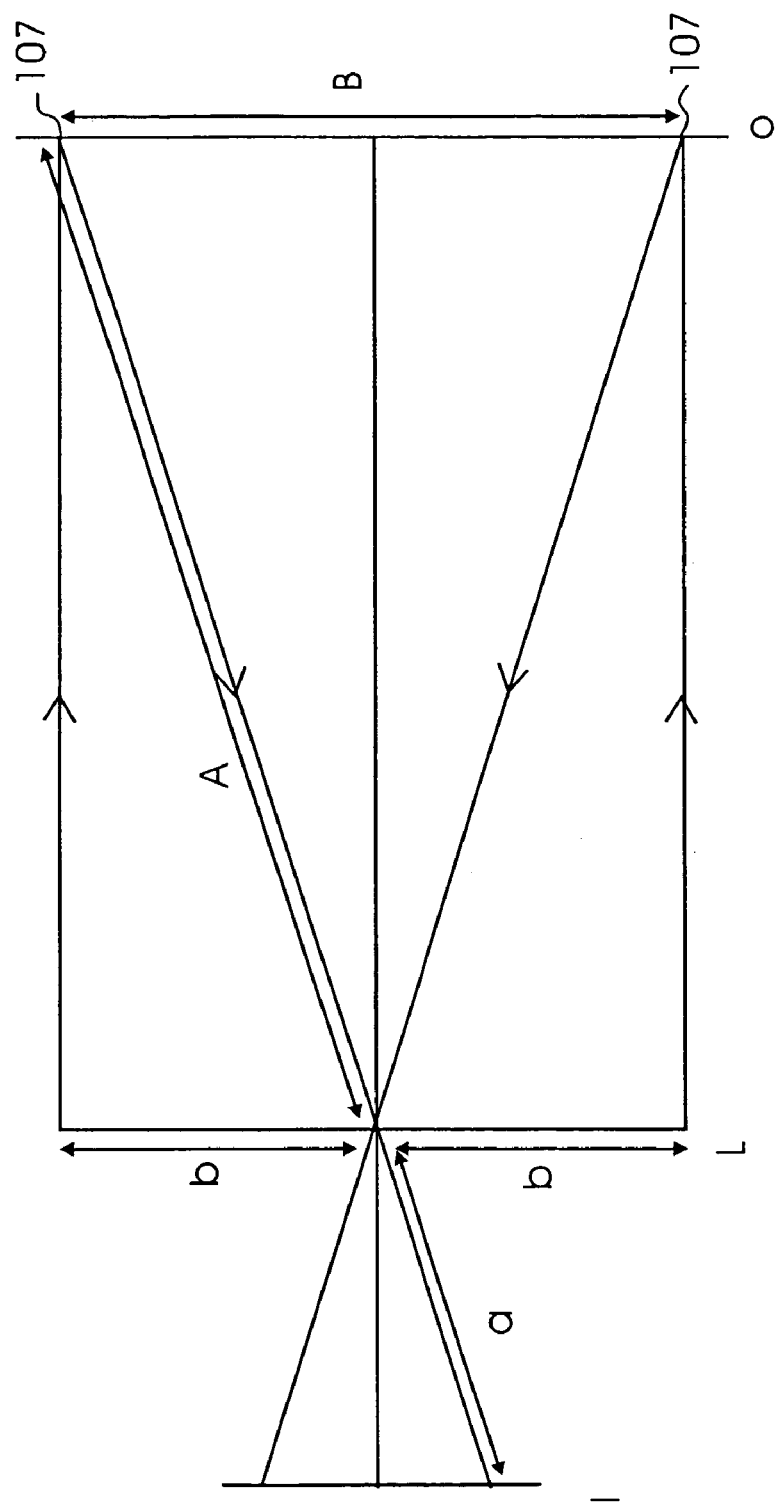
FIG. 9 illustrates a diagrammatic representation of light beams projected towards a surface, illustrating the origin offsets and projected markers and providing information for enabling the determination of x, z pixel size, the X, Y and Z origin offsets and the focal length.

FIG. 9 further illustrates this principal. FIG. 9 illustrates three planes, the image plane (I), a plane at which light is projected from a projection unit (L) and an object plane being a plane in the field of view (O). The image plate and image plane are linked by the optical characteristics of the imaging device. Beams of light are produced at the projection unit projecting beams towards plane O to produce a plurality of optical markers. Knowing the spatial off-set of the projection unit beam origins from the image plane (I) and knowing the angular relationship of beams projected from the projection unit a set of offset values can be determined such that the angular relationship of the markers from the image plate can be calculated. In this way a normalization process can be carried out to allow orientation and imaging processes to consider each beam as though it had been projected from the image plate such that trigonometrical surveys can be conducted to find out spatial and positional data of regions of reflectivity in the object plane (O). Once the calibration process has been carried out (calibration process described below) and where information regarding pixel dimensions, image plate dimensions and the spatial and angular offsets of the light sources and projection unit from the image plate are known such that distances a and b are known it is a matter of simple trigonometry to establish the distances (a+A) and B. This information can be obtained due to the fact that each pixel has a measurable physical dimension which can be related to the position of markers in a field of view.

Further referring to FIG. 9, O is parallel to I and L enabling a scale calculation in order to establish the pixel dimensions, focal distance and origin offsets. FIG. 28 illustrates examples of the obtainable information. For example, if the distance between O and L is fixed and the distance b (the origin offset) is known the focal distance and pixel size can be determined, hence the camera view angle can be calculated. Where a number of rows and columns of markers (as in FIG. 2B) are projected the lens distortion can be assessed, this being a function of the error in the linearity of the respective rows and columns in the image.

FIG. 9 is a simplistic representation to illustrate that distances between optical markers in a field of view e.g. distance B can be obtained. Typically, an image plate will not capture an image of a field of view that is entirely planar or parallel to the image plate. As a result it is necessary to calculate a set of orientation values which describe the angles of approach of the image plate with respect to each region of reflectivity in relation to each of the three-dimensional axes. This allows for the image area occupied by each individual pixel to be analyzed by a trigonometrical survey of the relationship between the orientation values computed and the optical markers 107 introduced to the field of view which have known angular and spatial relationships. By performing a geometrical vector analysis, x, y and z values can be assigned to each region of reflectivity within the field of view.

FIG. 10 illustrates an external perspective view of a first projection unit embodiment. The projection unit 1001 comprises a body portion forming a case for mounting of an imaging device, e.g. a digital camera at a mounting position 1004 on the main upper surface of the case. Projection unit 1001 comprises at least one light source and two beam origins mounted in fixed positions respectively for projection of light beams. The first beam origin 1002 is located at a first end of the projection unit and a second beam origin 1003 is located at a second end of the projection unit. Projection unit 1001 enables precision mounting of the beam origins at known spatial and angular relationships to the mounting position of the imaging device. By combining this information with camera specific information relating to the position of the image plate in a chosen camera model the exact spatial and angular relationships between the origin of each light beam and the image plate centre are determined. In use, an imaging device is fixedly mounted at mounting position 1004, e.g by using the camera tripod mounting means, on the projection unit upper surface to form a single operational unit for projection of light into a field of view and capturing of a two-dimensional image.

FIG. 11A illustrates a cut away plan view of an internal arrangement of a second projection unit embodiment. The projection unit comprises a body 1101 housing at least one light source 1102, e.g. a diode laser, providing a coherent light source. Light is emitted 1103 from light source 1102 and is focused by a set of collimation optics 1104 to form a first beam 1105. Beam 1105 is directed through prism 1106 which deflects the beam 1105 towards and through prism 1108. Prism 1108 splits the beam equally to produce two further light beams, formed at right angles, one of which is directed through a beam splitting optic 1109 to produce a plurality of beams 1110 configured to produce a first pattern of markers in the field of view. The second beam 1111 produced at prism 1108 is further directed via prism 1112 through a second beam splitting optic 1113 to produce a second set of beams 1114 configured to produce a second set of optical markers in the field of view. FIG. 11B illustrates an end elevation of the second projection unit embodiment and FIG. 11C illustrates a cut away side view of the light source 1102 and collimation optics 1104.

The purpose of the projection unit is to provide an array of light spots (the optical markers) into the field of view which can be captured by an associated imaging device. The relationships between the optical markers produced in the field of view are known as they relate to the origin of each beam in the projection unit. In the second projection unit embodiment the origin of each beam is formed at the beam splitting optics 1109, 1113 in a fixed position. Features of the first and second projection unit embodiments are interchangeable. The relationship between projection unit and image plate can be interpreted by the use of projective geometry, trigonometry and vector-analysis to calculate a set of orientation values.

By providing only a single light source 1102 and using penta-prisms as the prisms 1106, 1108, 1112 the need for calibration of the position of separate light sources can be minimised. This arrangement permitting a high degree of accuracy of the origin of each beam enabling the spatial relationships between each origin and the angular relationships of each beam produced to be accurately determined. Penta-prisms provide for accurate beam creation at specified angles relative to the entry beam and are less sensitive to variations in laser frequency than holographic lenses. Use of penta-prisms further provides for production of parallel beams without the need for significant calibration of the projection unit.

FIG. 11A further illustrates an alternative position of the light source. In this arrangement, a single light source 1115 is provided, arranged in-line with prism 1108. Prism 1106 is replaced with collimation optics 1107 to produce a single collimated light beam directed through prism 1108 which operates to form two light beams produced at right angles as described above.

Figure 11:
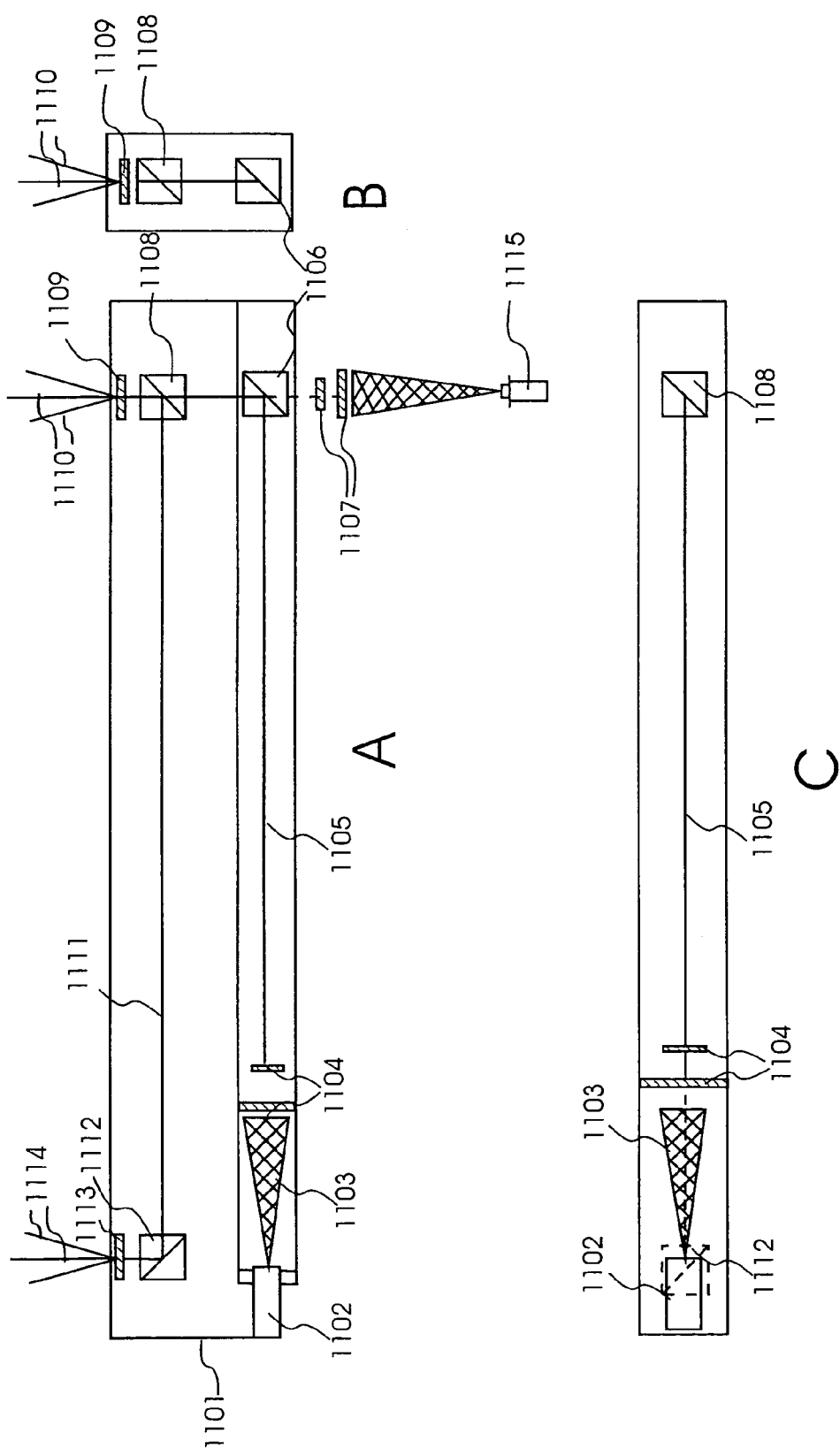
FIGS. 11A, B and C illustrates an internal plan view, end elevation and side view of a second projection unit embodiment.

In either arrangement illustrated in FIG. 11, the centre beam projected from each of origins 1109 and 1113 is preferably vertically and horizontally parallel and tilted down relative to the camera mount at the same angle.

Mounting an imaging device in association with one of the projection unit embodiments described enables the spatial and angular relationships between the image plate and the beam origins to be determined. Wherein the mounting position of the imaging device is known and the position of each beam origin is known such that the spatial and angular separations of the beam origins and resultant beams produced are also known in relation to the image plate.

A beam origin 1109 forming more than one beam is termed a "common origin". Beams projected from different origins are from "distinct" origins.

The optical apparatus forming the beam origins 1109, 1113 can be provided to have fixed optical characteristics which can be used, in conjunction with a suitable aperture, to determine the divergence of the projected beams. Knowing the angular view of the associated imaging device and the divergence of light beams emitted from the projection unit it is possible to configure the optical markers produced in the field of view to correspond to a required number of pixels in the image plate at a pre-determined distance of the object to the image plate. For example, the divergence can be configured such that one optical marker 107 is detected by a single pixel on the image plate at an image plate—object distance of 2 m.

The number of pixels that are covered by a single marker in the image are dependent on a number of factors, e.g. the resolution of the image being taken, the distance of the image plate to the region of reflectivity (the marker), the orientation of the camera to the striking plane, the beam divergence angle, the reflectivity of the striking plane and the photographic lighting conditions.

In a further projection unit embodiment the projection unit and imaging device are incorporated in a single unit. For instance, a digital camera comprising both an image plate formed by a CCD array and at least one light source and origin producing a plurality of light beams for projection into the field of view. This arrangement provides known angular and spatial offsets between the image plate and beam origins which can be incorporated in a single camera data file.

Each projection unit embodiment will have a separate set of beam configuration characteristics dependent on the setup of the origins within the unit. These beam configuration characteristics data sets configured to be stored as data files.

FIG. 12 illustrates table 1, being a typical laser specification for use as the light source in any of the projection unit embodiments.

In the preferred embodiments the projection unit provides for direct mounting of an imaging device at the projection unit or for inclusion of a projection arrangement within the imaging device itself. However, in further embodiments, and as illustrated in FIG. 1, a mounting means can be provided configured to mount a projection unit and imaging device in fixed spatial and angular arrangement.

The present invention comprises a method of obtaining three-dimensional positional data from a field of view. This method comprises the steps of capturing an image of a field of view, contained within the field of view are a plurality of optically detectable markers projected by a projection unit as previously described. A two-dimensional image is captured on an image plate having an array of pixels. Knowing a set of calibration values, a set of orientation values are determined which describe the orientation of the image plate with respect to the striking plane. The orientation of each region of reflectivity in the field of view can then be determined and used to produce a three-dimensional data set describing the three-dimensional position of each region of reflectivity in the field of view.

Figure 17:
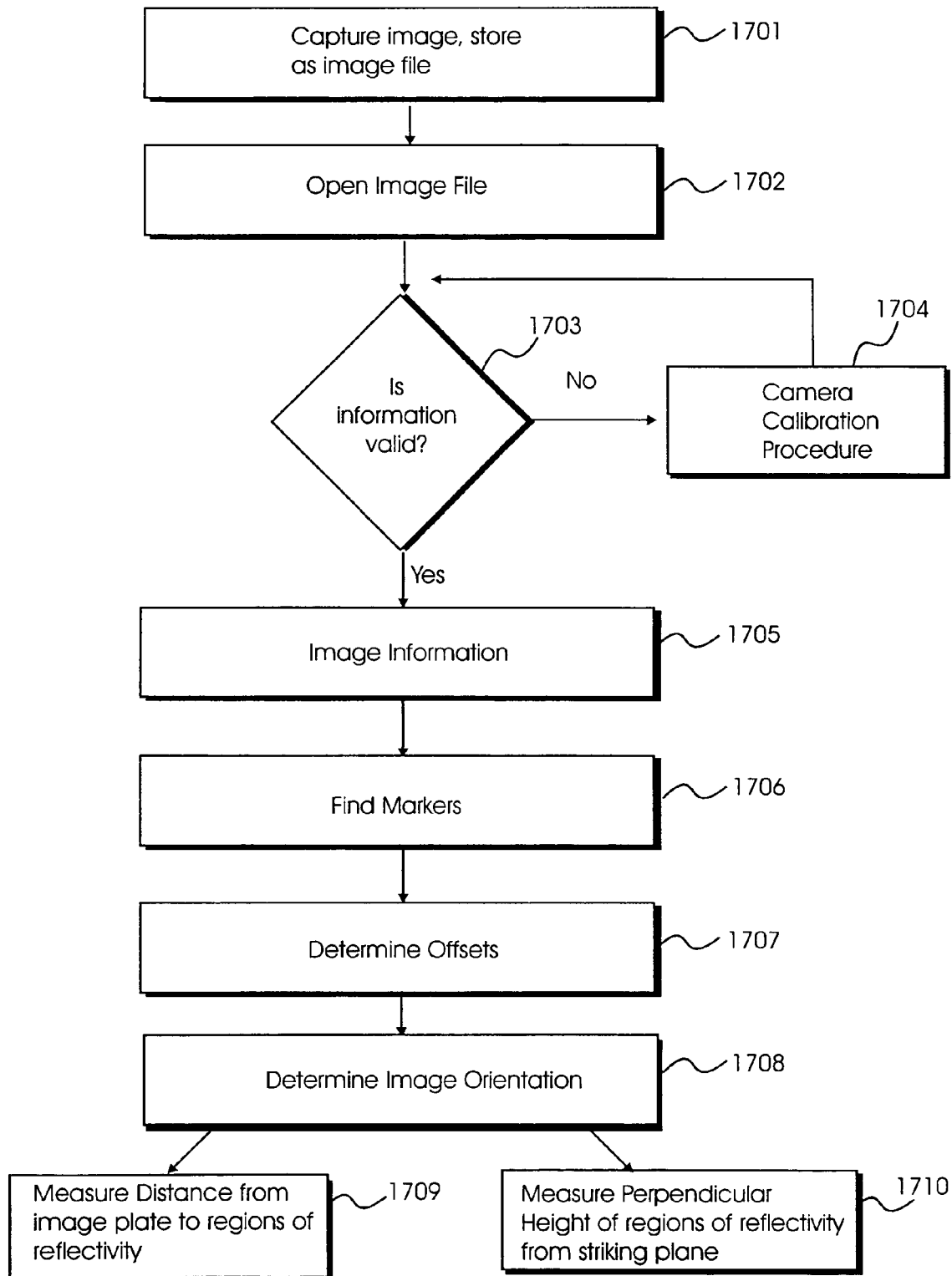
FIG. 17 illustrates schematically the method of determining image plate orientation values for use in determining distance from the image plate or perpendicular height measurements from the striking plane of each selected region of reflectivity of interest.

Referring to FIG. 17 herein there is illustrated a flow diagram illustrating an overview of the main method steps involved in determining positional field data of regions of reflectivity in a field of view. Initially, an image is captured of a field of view into which a plurality of markers have been introduced, wherein the spatial and angular relationships of the markers to the image plate are known or can be determined. This captured image 1701 is loaded to a PC, laptop or other processing means and the image file is opened 1702. A check is made to determine whether a set of valid camera and image calibration data is known 1703. If calibration data is unknown the camera calibration procedure 1704 is performed. Once the calibration data has been determined the image is processed 1705 to determine the image type and details relating to the imaging device from which the image was obtained and this information is stored. The markers introduced to the image are then identified 1706. The beam origin angular and spatial offsets from the centre of the image plate are calculated 1707 following which a determination of the orientation of the image plate to each region of reflectivity in the field of view of the image 1708 is determined. Calculation of this orientation information enables the further calculation of distance measurements 1709 to each region of reflectivity in the field of view and the calculation of perpendicular height measurements 1710 of each selected region of reflectivity from a striking plane.

Combining this information with the orientation values for tilt, pan and twist enables determination of the position of field data of each region of reflectivity in the field of view in three-dimensions.

In order to conduct the analysis of the captured image a set of calibration values describing the relationship of the image plate to the beam origins in terms of their spatial and angular offsets is required to be determined. Calibration values can be determined in a number of ways, the preferred method requires the focal distance of the image plate and the separation of each beam origin from the image plate centre (the offset) being known.

The camera calibration information can readily be obtained from the imaging device manufacturer or handbook information and used in combination with the known pre-determined position of the beam origins of a projection unit.

As such, calibration is only required if information relating to the camera image plate and optical characteristics is not available by other means.

Where camera and projection unit calibrations are known, the overall calibration of the combined unit is readily determined. For example the first projection unit embodiment, illustrated in FIG. 10, comprises two beam origins, each projecting a plurality of beams wherein the separation of the beam origins from the mounting position of the digital camera forming the imaging device is known or can be measured. The focal distance of the imaging device and the precise position of the centre of the image plate can be determined from the manufacturers information. Accordingly, the x, y and z offsets of the beam origins from the centre of the image plate are determined. Additionally, the x and z pixel dimensions are determined from the manufacturers information. Sample calibration values comprise the following:

x, y and z offsets of each beam origin from the image plate, these offsets being the distance in each of the three-dimensional axes from the beam origins to the image plate;

x and z pixel dimensions;

angle of deviation of the image plate from the normal plane;

Image plate width and height;

x and z image plate view angles;

Imaging device focal length.

The calibration details can be stored in a data file, for example an exif data file as determined by the "*Digital still camera image file format standard, version* 2.1, December 1998, Japan Electronic Industry Development Association" incorporated herein by reference. Accordingly, a software package may be provided having pre-determined calibration values and beam configuration characteristics stored in respect of a plurality of imaging devices e.g. several makes of digital camera. The user simply selects the digital camera model which has been used to obtain the two dimensional image and the correct calibration values and beam configuration characteristics for a particular camera and projection unit respectively are retrieved for use in the determination of orientation values and three-dimensional positional data of regions of reflectivity in the field is of view.

FIG. 28 illustrates table 3 describing examples of the calibration values which can be obtained where a specific subset of the calibration values are known.

One example of a digital camera having an associated exif image file is the Minolta® Dimage™ 7.

For imaging devices where aspects of the required calibration values are unknown, the calibration values can be determined by mounting a camera at a pre-determined position from a reference plane having a marked scale. A plurality of images are taken at a plurality of pre-determined distances from the reference plane enabling a scale calculation to be made combining known camera information regarding focal length of the camera and the camera photographic resolution thereby enabling determination of the remaining calibration values which can then be stored in a specific data file relevant to the chosen imaging device. In general, all calibration information regarding a particular camera and projection unit can be determined from the manufacturers information and exif file data, the combined calibration values being stored in a single data file. As such the user need not perform any calibration steps.

By using a set of calibration values specific to a particular imaging device and beam configuration characteristics specific to a particular projection unit it is possible to conduct an image analysis by implementing a set of orientation values to calculate spatial positional data from the captured image combining information provided by the plurality of optical markers introduced to the image having known associated angles and spatial relationships to the image plate.

As each set of calibration values is specific to one image plate type a plurality of calibration data files are required, the user selecting specific data files comprising the relevant calibration data and beam configuration characteristics for any one combination of imaging device and projection unit. This selection of calibration values for different digital cameras and beam configuration characteristics for different projection units is provided in a software package such that the user can tailor that package to the specific hardware used to capture the image. Calibration values and beam configuration characteristics can be stored for both different imaging devices and projection units, wherein differing projection units have different resultant spatial and angular offset values.

FIG. 13 illustrates table 2 which describes a sample selection of commercial information available on purchasing a particular make of digital camera.

Figure 18:
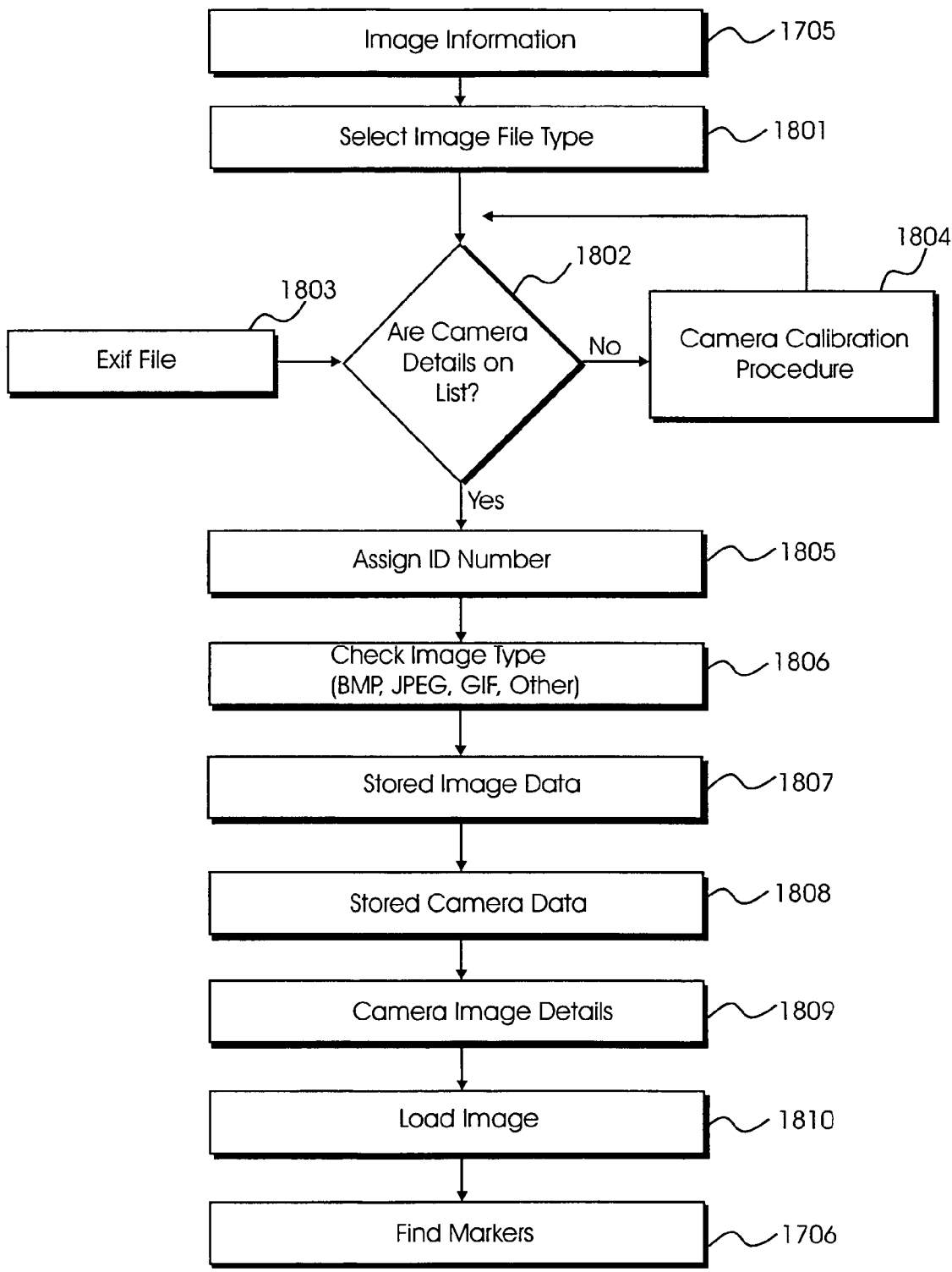
FIG. 18 illustrates schematically the method steps for manipulating image information and camera specific information in order to initiate a determination of a set of orientation values.

Referring to FIG. 18 herein the method steps for processing the uploaded image file in a processing means are illustrated. The uploaded image information 1705 may be one of a plurality of image file types e.g. BMP, JPEG, GIF, TIF or other image file type. The appropriate image file type is selected 1801 following which a further check for camera information is made 1802. If the camera calibration information is not present this may be introduced from a data file 1803 or via a camera calibration procedure 1804. Once the camera calibration information is obtained the image is assigned an identification number 1805. A further check of the image type is made 1806 before the image data is stored 1807. The camera calibration data associated with the specific image is also stored 1808 and associated with the image. This enables a combined set of camera and associated image details 1809 to be stored in a memory means. The image is then loaded and displayed 1810 to determine the position of the optical markers 1706 in the captured image. Storage, processing and display of image information is suitable for implementation by a conventional PC, Macintosh® computer or the like.

In order to establish a set of orientation values the position of each optical marker in the captured image is identified in order to determine the location of the at least one pixel within which the optical marker is located in the image. Essentially, this is a search for laser points which can be carried out manually wherein a two-dimensional image (e.g. BMP, JPEG, MPEG, GIF, TIF or other file type) is uploaded to a computer for viewing. Manual location of the points is carried out by the user wherein the user identifies the optical markers within the two-dimensional captured image and highlights the markers, e.g. by a mouse-click. Alternatively, an automatic search for the optical markers can be conducted searching the image for a particular wavelength of light, typically of a wavelength of 635 nm or 650 nm. A Fourier transform or colour based search are alternative search methods. Once the location of all the optical markers has been identified within the two-dimensional captured image the orientation step can be conducted.

Figure 19:
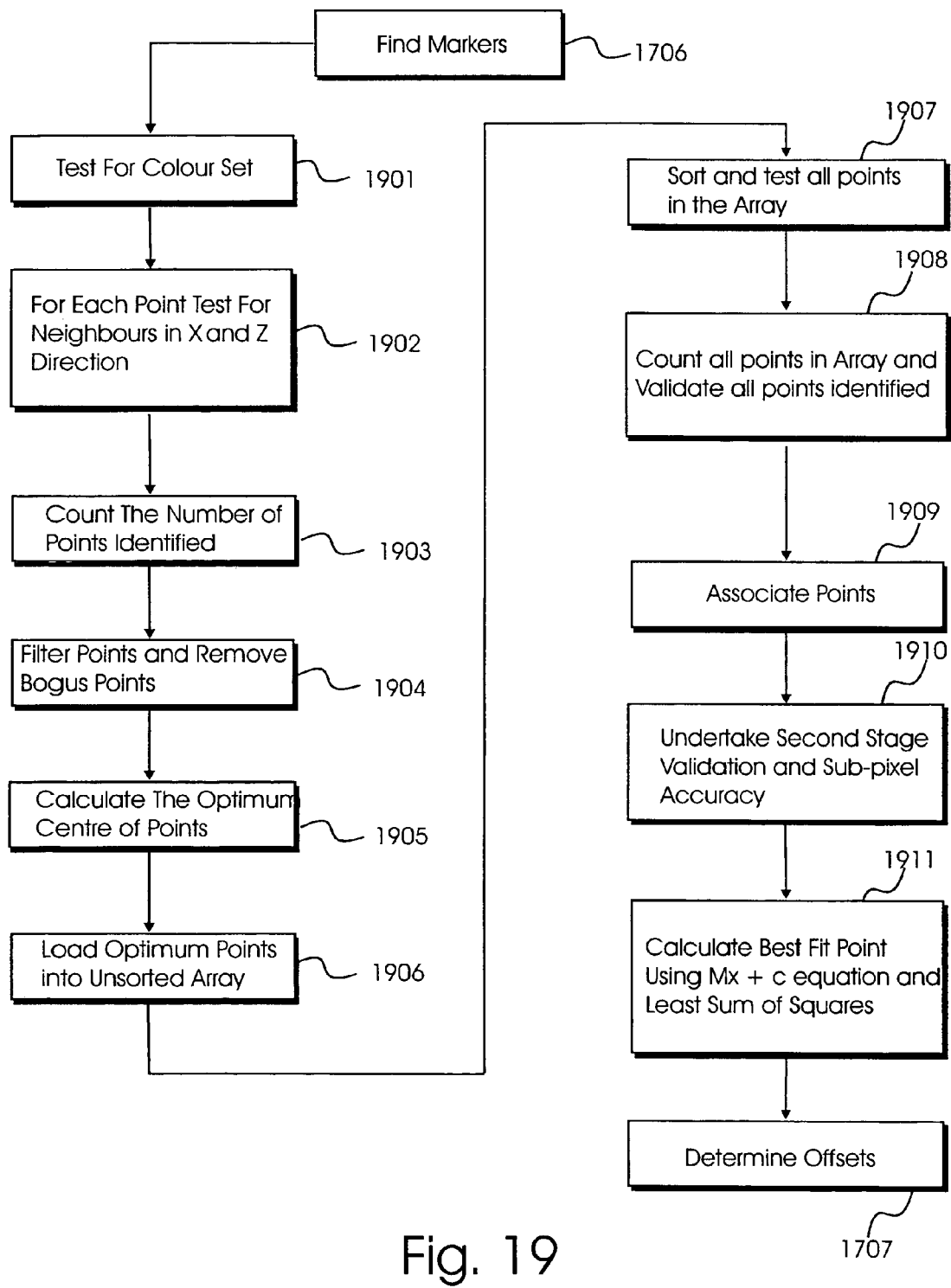
FIG. 19 illustrates schematically the method steps for identification of markers introduced to the captured image and reduction of associated errors.

FIG. 19 illustrates the process of searching for optical markers in a two-dimensional image of a field of view containing a plurality of optical markers which have been introduced to the field of view. The uploaded image is searched throughout its width and height until a colour match, typically for an optical marker of wavelength 635 nm or 650 nm is obtained 1901. Having found a colour match, data relating to the x and z position of the matched pixel is stored. For each identified point a test is made for the neighboring pixels in the x and z direction 1902. The search is progressed in a spiral pattern until all of the optical markers have been located and the location coordinates stored. The number of points identified is calculated 1903 and checked against the known number of points introduced to the image. A filter is then made to remove false marker points 1904. A calculation is made to determine the optimum centre of each point 1905. The optimum centre of each spot is combined with information from the pixel array 1906 following which all of the points in the array are sorted and tested 1907 to further determine the precise identification of each marker within the array. All points in the array are then calculated and validated such that each point in the array is identified at a particular location 1908 following which each point in the array can be associated 1909. A further validation step to check the position of each marker along with a determination of the location of each marker via an analysis of the sub-pixel accuracy of each marker identified 1910 is conducted. An Mx+c best-fit analysis 1911 is implemented combining an error reduction step of the least sum of squares or any other error reduction routine. Data relating to the location of each identified marker is then stored. This process may then be repeated for the next image.

Figure 20:
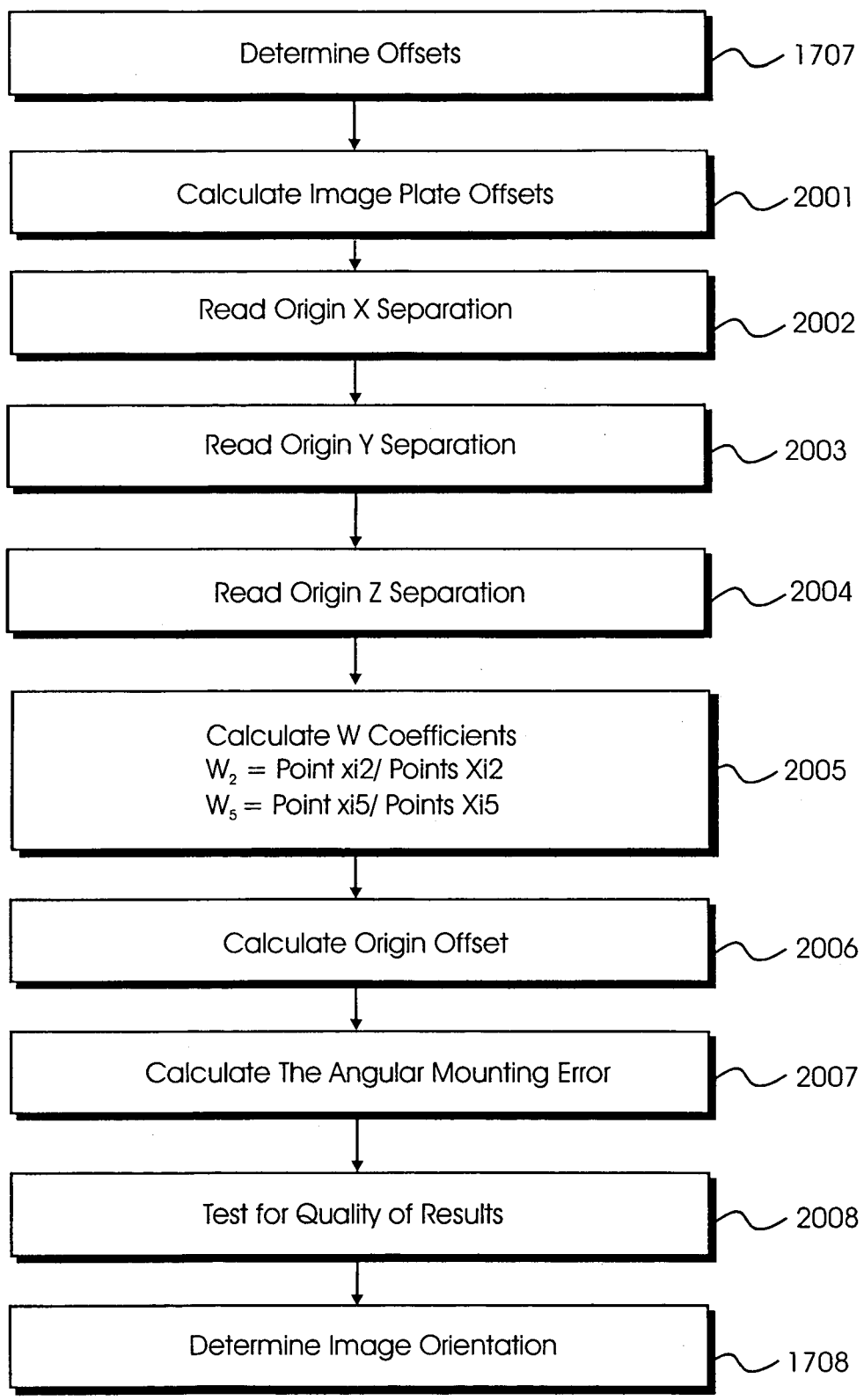
FIG. 20 illustrates schematically the method steps for determination of offset values describing the offset of the marker origins with respect to the image plate, including accounting for the camera mounting error.

Before the orientation analysis can be conducted a determination of coefficients of the beam origin offsets from the image plate centre is made. Referring to FIG. 20, this process requires calculation of the image plate offset 2001 by reading calibration data relating to beam origin X, Y and Z separations from the image plate centre (2002, 2003, 2004). A coefficient, W, for each optical marker is calculated 2005 which enables determination of a set of beam origin offset values 2006. This data enables calculation of an angular mounting error of the imaging device on the projection unit 2007. A test for the accuracy of results is made 2008. Having determined the position of optical markers in the image, knowing a set of calibration values and having determined a set of offset values a determination of the image plate orientation with respect to each region of reflectivity in the field of view is made 1708.

The determination of the beam origin offsets 2006 is made as follows:

$$\frac{xi}{zi} = \frac{X}{Z} = Wi \qquad \text{Equation 2}$$

-continued $$x_1 = \frac{Wi(X - WpZ)}{Wi - Wp} \quad \text{Equation 3}$$

Wherein:
X=beam origin separation in x axis;
Z=beam origin separation in z axis;
xi=image position in x axis;
zi=image position in z axis;
Wi=coefficient of x axis;
Wp=coefficient of z axis As the method of determining three-dimensional positional data of regions of reflectivity in a field of view is reliant on the relationship between the physical dimension of individual pixels in an image plate and the area of real world image in the field of view imaged by that pixel it is necessary, in order to obtain the three-dimensional positional data required, to perform an orientation step. The orientation step determines the amount of relevant orientation values of the camera image plate when a particular captured image was obtained. The orientation values comprise the tilt, pan, twist and height of the image plate from each of the regions of reflectivity in the field of view when the image was captured.

The orientation values tilt, pan and twist have the following definitions with reference to FIG. 14 herein wherein 1401 represents the image plate and 1402 represents the striking plane;
  tilt is defined by a rotation about the x axis;
  twist is defined by a rotation about the y axis;
  pan is defined by a rotation about the z axis.

The y axis is represented by the optical axis of the camera, the height of the image plate defines the z axis and the width of the image plate defines the x axis. The lens of the camera is defined as having the coordinate positions 0, 0, 0.

FIG. 14 further illustrates the distances $X_G$, $Y_G$ and $Z_G$. These are the distances to the point at which the respective plane intersects taking account of the amount of tilt and pan. In some conditions it is not possible to determine all of these values as the respective plane does not intersect with the appropriate axis. For example, where the plane is perpendicular to the normal there is zero tilt and zero pan. Twist is therefore unknown as $Z_G$ and $X_G$ are both infinity.

The mathematical definitions of tilt, pan and twist are as follows:
  vector (N, 1, M) defines the normal to the plane for which pan and tilt are determined, where:

$$Nx+y+Mz=Y_G \quad \text{Equation 4}$$

pan angle is given by:

$$\alpha = -\tan^{-1} N \quad \text{Equation 5}$$

tilt angle is given by:

$$\beta = -\tan^{-1}\left(\frac{M}{\sqrt{1+N^2}}\right) \quad \text{Equation 6}$$

twist angle is given by:

$$\delta = -\tan^{-1}\left(\frac{\tan\alpha}{\sin\beta}\right) \quad \text{Equation 7}$$

and, $$Z_G = -\left(\frac{Y_G}{M}\right) \text{ and } X_G = \frac{Y_G}{N} \quad \text{Equations 8 and 9}$$

Where, N represents the tilt coefficient and M represents the pan coefficient.

Figure 15:
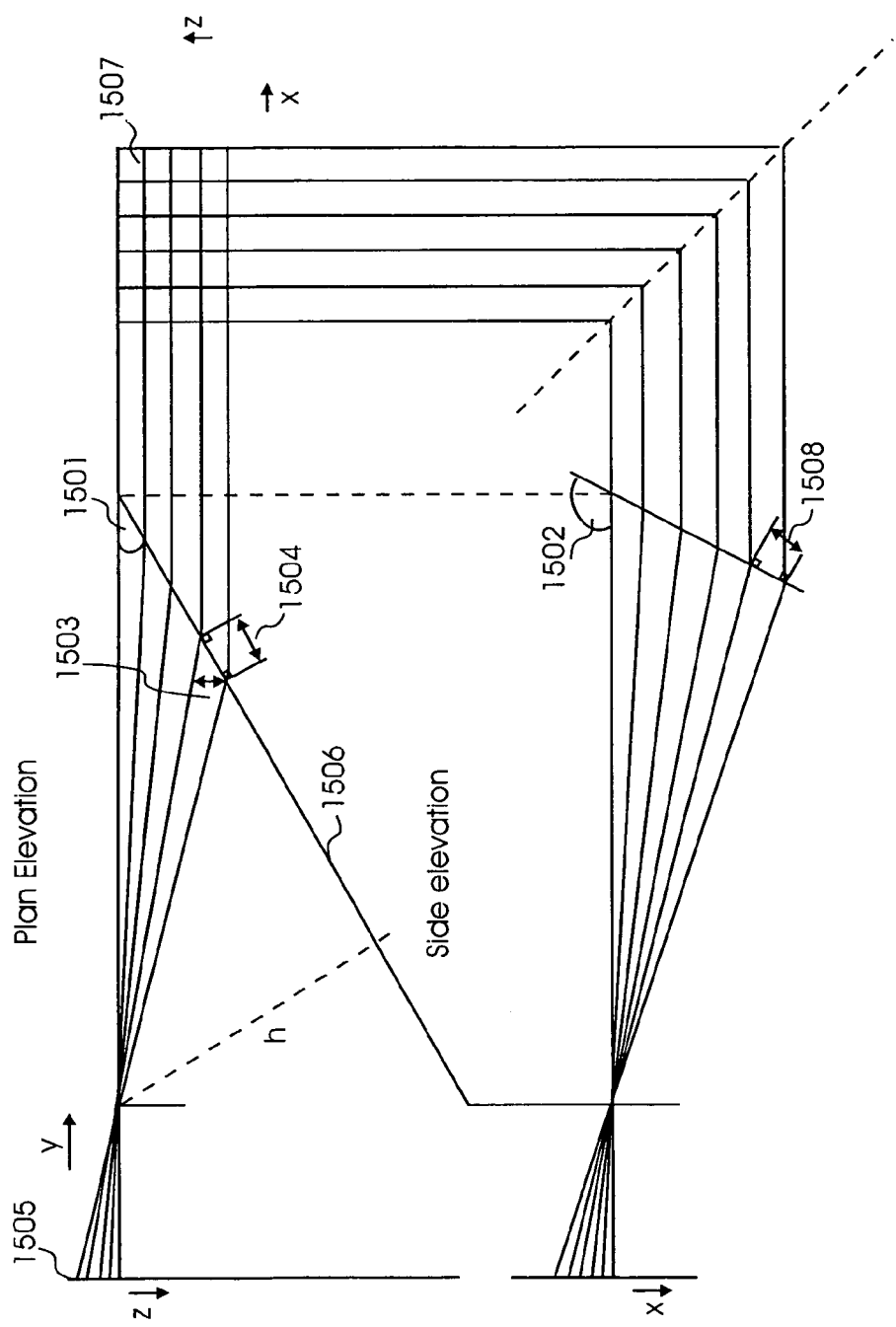
FIG. 15 illustrates diagrammatically the change in pixel linear worth with varying image plate orientation.

FIG. 15 is a representative illustration of the effect of pan and tilt and the real world space which is absorbed by a single pixel. Angle 1501 is the tilt and angle 1502 is the pan of the image plate with respect to the plane of the field of view. It is readily noticeable that depending on the orientation of the image plate 1505 to the plane 1506 the area of plane absorbed by a single pixel (the pixels worth) differs depending on the orientation of image plate to the plane 1506. The pixel linear worth in z is represented by 1503, the pixel linear worth in y is represented by 1504 and the pixel linear worth in x is represented by 1508. Reciprocating this arrangement for a fixed orientation of image plate with varying tilt, pan and twist in the field of view, the area of real world space absorbed by a single pixel will vary with the orientation values which are therefore representative of a three-dimensional position of each of the regions of reflectivity in the field of view.

The input data required to calculate the degree of tilt, pan and twist of the image plate center when the photograph (image capture) was taken is as follows:
  Focal length of camera;
  x and z pixel dimensions;
  x and z pixel positions of the located optical markers in the image;
  x and z image resolution;
  Beam configuration characteristics and origin—image plate offset.

Non-exclusive output data from the determination of orientation values includes the:
  Tilt deviation of the camera to the plane;
  Pan deviation of the camera to the plane;
  The height of the camera to the image plate center;
  Twist deviation of the image plate;
  Center axis of the plane at which the markers strike ($Y_G$); and
  $X_G$, $Z_G$ and the shortest distance to the plane.

Determination of image orientation comprises the determination of a set of orientation values by vector analysis. The calculations are suitable for matrix analysis. The calculation steps are preferably implemented by running of a software package on a personal computer or other processing means.

Figure 21:
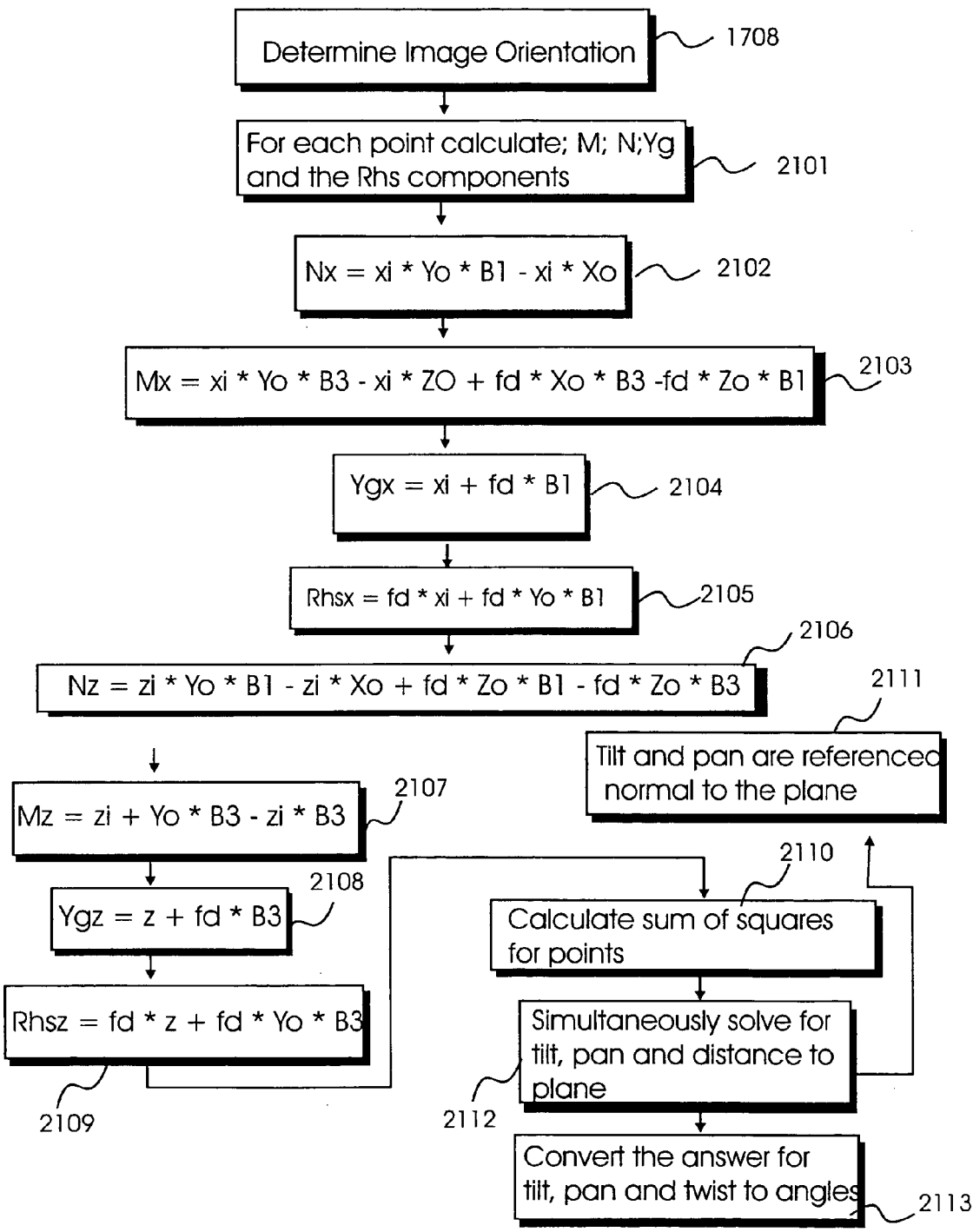
FIG. 21 illustrates schematically the method steps for determining a set of orientation values describing the orientation of the image plate relative to a plurality of regions of reflectivity in the captured image.

Referring to FIG. 21 herein determination of image plate orientation 1708 requires the calculation of pan, tilt and the centre axis coefficient and the resultant coefficient components 2101. Calculation of these coefficients is illustrated at steps 2102 to 2109. A sum of the squares calculation 2110 is conducted for all points to reduce errors wherein the resultant equations are simultaneously solved for tilt, pan and distance to the striking planes 2112. The resultant tilt and pan values are referenced normal to the striking plane 2111. Each of the values for tilt and pan are converted into angular measurements 2113. The following key relates to FIG. 21:

N represents the tilt coefficient;
M represents the pan coefficient;
Yg=centre axis intersection distance;
Rhs=right hand side coefficient;
xi=image point in x;
zi=image point in z;
fd=focal distance;
Xo=X offset of the beam origin;
Yo=Y offset of the beam origin;
Zo=Z offset of the beam origin;
B1=Vector direction, up/down angle, of the light beams;
B3=Vector direction, left/right angle, of the light beams.

Where N, M, $Y_G$ are the vectors defining the striking plane.

Calculation of the x image coordinates is conducted according to:

$$N(x_i y_1 b_1 - x_i x_1) + M(x_i y_1 b_3 - x_i z_1 + dx_1 b_3 - dz_1 b_1) + Y_G(x_i + db_1) = -dx_1 + dy_1 b_1 \quad \text{Equation 10}$$

Calculation of the z image coordinates is conducted according to:

$$N(z_i y_1 b_1 - z_i x_1 + dz_1 b_1 - dx_1 b_3) + M(z_i y_1 b_3 - z_i z_1) + Y_G(z_i + db_3) = -dz_1 + dy_1 b_3 \quad \text{Equation 11}$$

Wherein:
$Y_G$=centre axis intersection distance (distance of the optical axis to the striking plane);
N represents the tilt coefficient;
M represents the pan coefficient;
$x_i$, $z_i$=image plane coordinates;
$x_1$, $y_1$, $z_1$=beam origin point coordinates;
d=focal distance;
$b_1$, $b_3$=angular direction of each light beam.

Further referring to FIG. 21 herein, the striking plane errors are calculated by a sum of the squares 2110 according to equation 6 below:

$$x \sum_{i=1}^{N} a_i^2 + y \sum_{i=1}^{N} a_i b_i + z \sum_{i=1}^{N} a_i c_i = \sum_{i=1}^{N} a_i d_i \quad \text{Equation 12}$$

$$x \sum_{i=1}^{N} a_i b_i + y \sum_{i=1}^{N} b_i^2 + z \sum_{i=1}^{N} b_i c_i = \sum_{i=1}^{N} b_i d_i$$

$$x \sum_{i=1}^{N} a_i c_i + y \sum_{i=1}^{N} a_i c_i + z \sum_{i=1}^{N} c_i^2 = \sum_{i=1}^{N} c_i d_i$$

For objects on a plane, it is necessary to determine the position of a region of reflectivity both on the plane and off the plane. If:

$R_1 R_2$ is an object having an edge in the striking plane; and
$R_1$ is imaged on the plane; and
$R_2'$ is imaged vertically above point $R_1$ with respect to the striking plane; and
$R_2$ is the point on the plane itself if the object was lying on the plane having no depth.

Accordingly the image point and striking plane are given as follows:

| Image Point | Coordinates (x, z) in mm | |
|---|---|---|
| $I_1$ | $(p_1, -d, q_1)$ measured on the image plane | Equation 13 |
| $I_2$ | $(p_2, -d, q_2)$ measured off the image plate | | and,

| Striking Plane | Coordinates (x, y, z) in mm | |
|---|---|---|
| $R_1$ | $\begin{pmatrix} f_1 \\ g_1 \\ h_1 \end{pmatrix} = \frac{Y_G}{(Np_1 - d + Mq_1)} \begin{pmatrix} p_1 \\ -d \\ q_1 \end{pmatrix}$ | Equation 14 |
| $R_2$ | $\begin{pmatrix} f_2 \\ g_2 \\ h_2 \end{pmatrix} = \frac{Y_G}{(Np_2 - d + Mq_2)} \begin{pmatrix} p_2 \\ -d \\ q_2 \end{pmatrix}$ | |

| Striking Plane | Coordinates(x, y, z) in mm | |
|---|---|---|
| $R_2'$ | $\begin{pmatrix} f_2' \\ g_2' \\ h_2' \end{pmatrix} = \frac{h_1 - Mg_1}{q_2 + dM} \begin{pmatrix} p_2 \\ -d \\ q_2 \end{pmatrix}$ | Equation 15 |
| | $\begin{pmatrix} f_2' \\ g_2' \\ h_2' \end{pmatrix} = \frac{f_1 - Ng_1}{p_2 + dN} \begin{pmatrix} p_2 \\ -d \\ q_2 \end{pmatrix}$ | |
| | $\begin{pmatrix} f_2' \\ g_2' \\ h_2' \end{pmatrix} = \frac{Mf_1 - Nh_1}{Mp_2 - Nq_2} \begin{pmatrix} p_2 \\ -d \\ q_2 \end{pmatrix}$ | |

Accordingly, the Z and X world coordinates for each vector corresponding to the pan, tilt and twist of each imaged region of reflectivity is calculated.

The striking plane is the plane in the field of view, either pre-existing in the field of view or introduced to the field of view, onto which the markers are projected. For image analysis purposes only those markers present on the striking plane are analyzed, markers striking the field of view outside the striking plane are filtered out as false markers.

The striking plane provides a reference plane from which a number of rotation transformations can be carried out, this enables determination of the coordinates of a point on the striking plane in terms of a local coordinate system using values of the coordinates expressed in the camera axes. As the vector definitions of the striking plane in the x, y and z directions are given as $(X_G, 0, 0)$, $(0, Y_G, 0)$, $(0, 0, Z_G)$ respectively, rotation transformations can be achieved to transform from (x, y, z, 1) to (X, Y, Z, 1). These translations and transformations are conducted via a matrix analysis wherein a translation step in the x, y and z directions is conducted followed by a rotation to account for tilt, twist, and pan.

An example transformation considers moving the axis origin such that the x and z axes lie in the striking plane. The homogeneous image coordinates are (x, y, z, 1) wherein the y coordinate is −d (the negative of the focal distance) the homogeneous striking plane coordinates will be (X, Y, Z, 1) in which Z is expected to be 0 for describing points on the striking plane. To transform between the two a translation to move the origin to the foot (F at $(0,0,Z_G)$) of the camera is made followed by a rotation about the x axis to line the new y axis with the line joining F with $Y_G$. Thirdly, the twist angle is determined by establishing the change in the normal vector. This is followed by a rotation to obtain the new x axis to lie in the striking plane. In summary moving the origin a positive distance l is conducted as follows:

$$\begin{bmatrix} X \\ Y \\ Z \\ 1 \end{bmatrix} = T_3 T_2 T_1 \begin{bmatrix} x \\ y \\ z \\ 1 \end{bmatrix} \quad T_1 = \begin{bmatrix} 1 & 0 & 0 & 0 \\ 0 & 1 & 0 & 0 \\ 0 & 0 & 1 & l \\ 0 & 0 & 0 & 1 \end{bmatrix} \quad \text{Equation 16}$$

$$T_2 = \begin{bmatrix} 1 & 0 & 0 & 0 \\ 0 & \cos\alpha & \sin\alpha & 0 \\ 0 & -\sin\alpha & \cos\alpha & 0 \\ 0 & 0 & 0 & 1 \end{bmatrix}$$

$$T_3 = \begin{bmatrix} \cos\beta & 0 & \sin\beta & 0 \\ 0 & 1 & 0 & 0 \\ -\sin\beta & 0 & \cos\beta & 0 \\ 0 & 0 & 0 & 1 \end{bmatrix}$$

To recover the coordinates in terms of the camera axes of a point from the striking plane given in local coordinates the inverse of this matrix equation is used, i.e:

$$\begin{bmatrix} x \\ y \\ z \\ 1 \end{bmatrix} = T_1^{-1} T_2^{-1} T_3^{-1} \begin{bmatrix} X \\ Y \\ Z \\ 1 \end{bmatrix} \quad \text{Equation 17}$$

Wherein the Z coordinate will be zero for a point on the striking plane.

Figure 16:
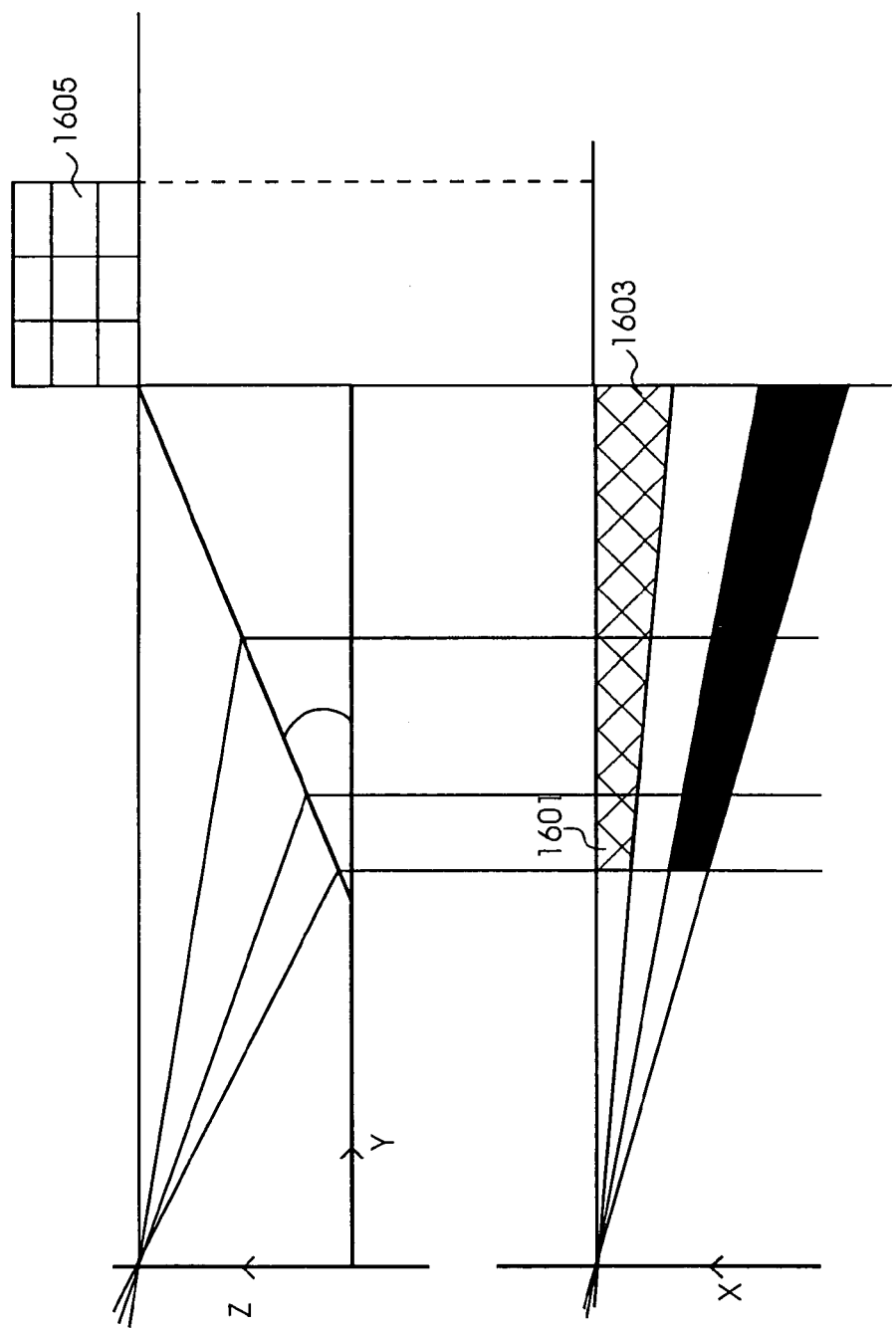
FIG. 16 illustrates a diagrammatic representation of the effect of varying x, y and z on the representative object area associated with a single pixel.

The output of the orientation process described in FIGS. 17 to 21 is the establishment of a set of orientation values describing the orientation of each pixel in the image plate to the optical markers in the two-dimensional image of the field of view. Having established these orientation values it is possible to orientate the entire pixel array with respect to all regions of reflectivity in the field of view in the real world with reference to the image plate. This provides information about each pixel and the area in the real world to which each pixel is associated (the pixel worth). FIG. 16 represents the real world area that a pixel 1605 represents in the two-dimensional captured image. With reference to FIG. 16 the following statements hold true:

Where the height varies and the plane in the field of view retains a constant tilt, pan and twist:
As the image height grows in the z direction the area that a pixel represents in x and y increases (compare 1601 and 1603);
As the image height reduces in the z direction the area that a pixel represents in x and y decreases.

Where tilt varies and height, pan and twist remain constant:
As the image tilt angle grows the area that a pixel represents in x and y increases;
As the image tilt angle reduces the area that a pixel represents in x and y decreases.

Where pan varies and height, tilt and twist remain constant:
If the pan angle is zero the distance in x and y remains constant for each y axis in x;
As the pan angle is introduced the effect on the x and y distance varies;
If the pan angle is positive then the pixel worth to the left half increases and to the right decreases;
If the pan angle is negative then the pixel worth to the left half decreases and to the right increases.

The orientation of the entire pixel array in the real world with reference to the camera image plate can therefore be calculated.

In order to calculate the three-dimensional positional data of each region of reflectivity in the field of view the image analysis is conducted to obtain the world X, Y and Z positions for each pixel and the image plate in accordance with equations 4 to 17. The image analysis comprises the determination of the convergence of points or planes in the space domain. The image analysis steps require the following data to be established
x and z pixel dimensions;
x and z pixel position;
x and z image resolution;
Tilt, pan and twist deviation of the image plate to the plane (there is twist in the vertical plane);
$Y_G$ For regions of reflectivity in the same x plane a determination of x and z with many y's is made and all vectors of x, y and z are determined. Where all regions of reflectivity are not in the same x plane a calculation of x and y with many z's is made to calculate all vectors x, y and z. This data is stored The output data determined from the image orientation are as follows:
A pixel array with corresponding world X positional data for each pixel in the captured image;
A pixel array with all of the world Y positional data for each pixel in the captured image;
A pixel array with all the world Z positional data for each pixel in the captured image.

The real world X, Y and Z co-ordinates can then be established for each pixel corresponding to the three-dimensional positional data of each region of reflectivity in the field of view captured on the image plate.

This real world X, Y and Z stored data is the primary data upon which a three-dimensional map/model of the captured image can be reconstructed. A further step in the image analysis process is to employ an edge detection module to systematically search the captured two-dimensional image for object and point edges in the captured image. The edge detection results can then be correlated with the world X, Y and Z positional data to provide a finalised X, Y and Z data set. This finalised X, Y and Z data set can then be used to reconstruct three-dimensional models of the regions of reflectivity in the captured image, that is to reconstruct a virtual three-dimensional model of objects and surfaces in the field of view.

Figure 22:
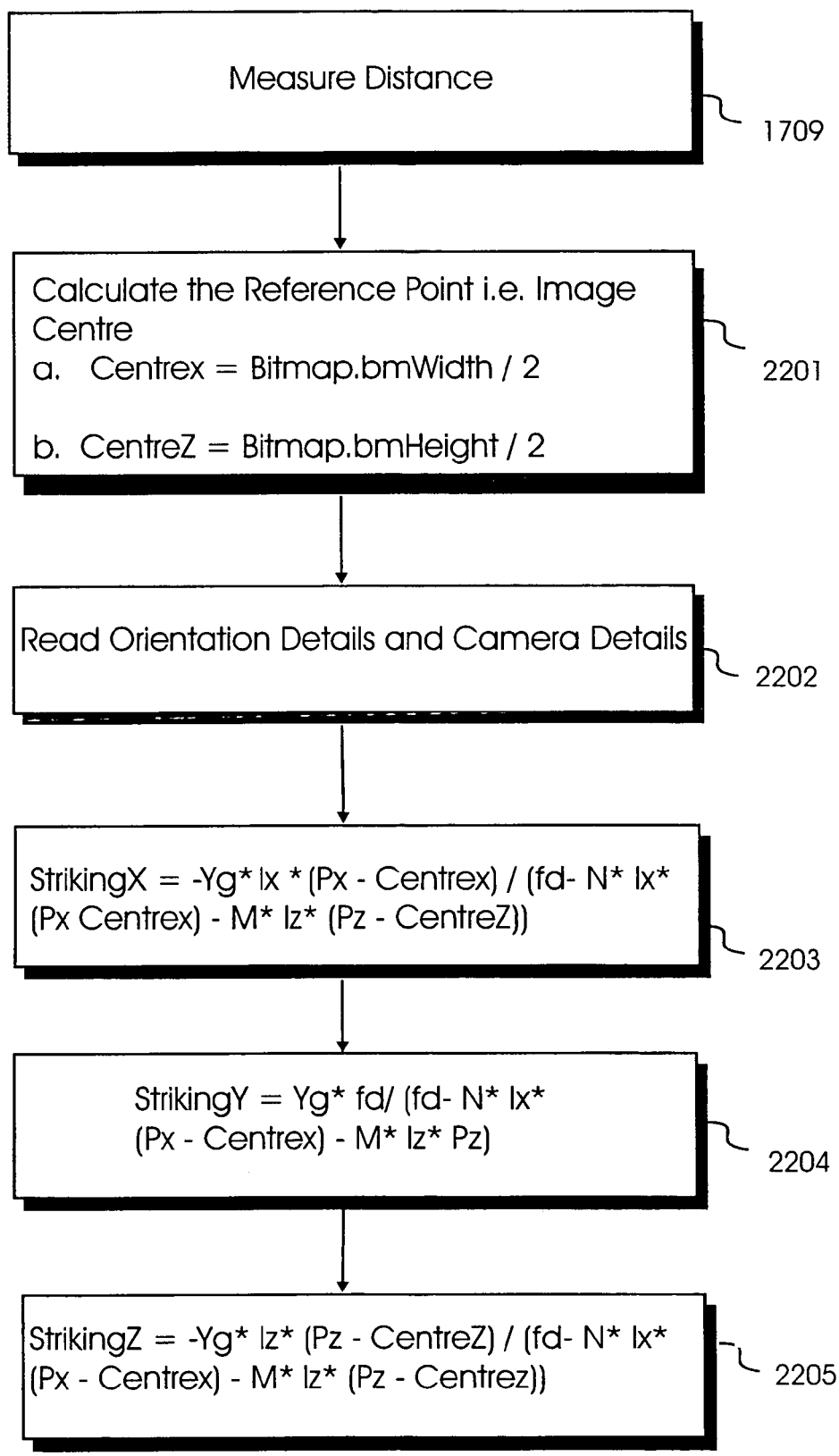
FIG. 22 illustrates schematically the method steps for determining the distance from the image plate to a selected region of reflectivity in the imaged field of view.

Referring to FIG. 22 herein the orientation values obtained enable calculation of the distance to each of the regions of reflectivity in the field of view. Combined with the orientation in respect of tilt, pan and twist of the image plate this enables determination of the three-dimensional positional data of each region of reflectivity in the field of view. The distance measurement comprises calculation of the image centre point 2201, the orientation values and camera calibration details 2202 are retrieved and the X, Y and Z real world coordinates on the striking plane (2203 to 2205) are determined wherein:

Px=point of interest in x;
Pz=point of interest in z;
Ix=x pixel size;
Iz=z pixel size;
M represents plane tilt;
N represents plane pan;
Yg=centre axis intersection distance.

Figure 23:
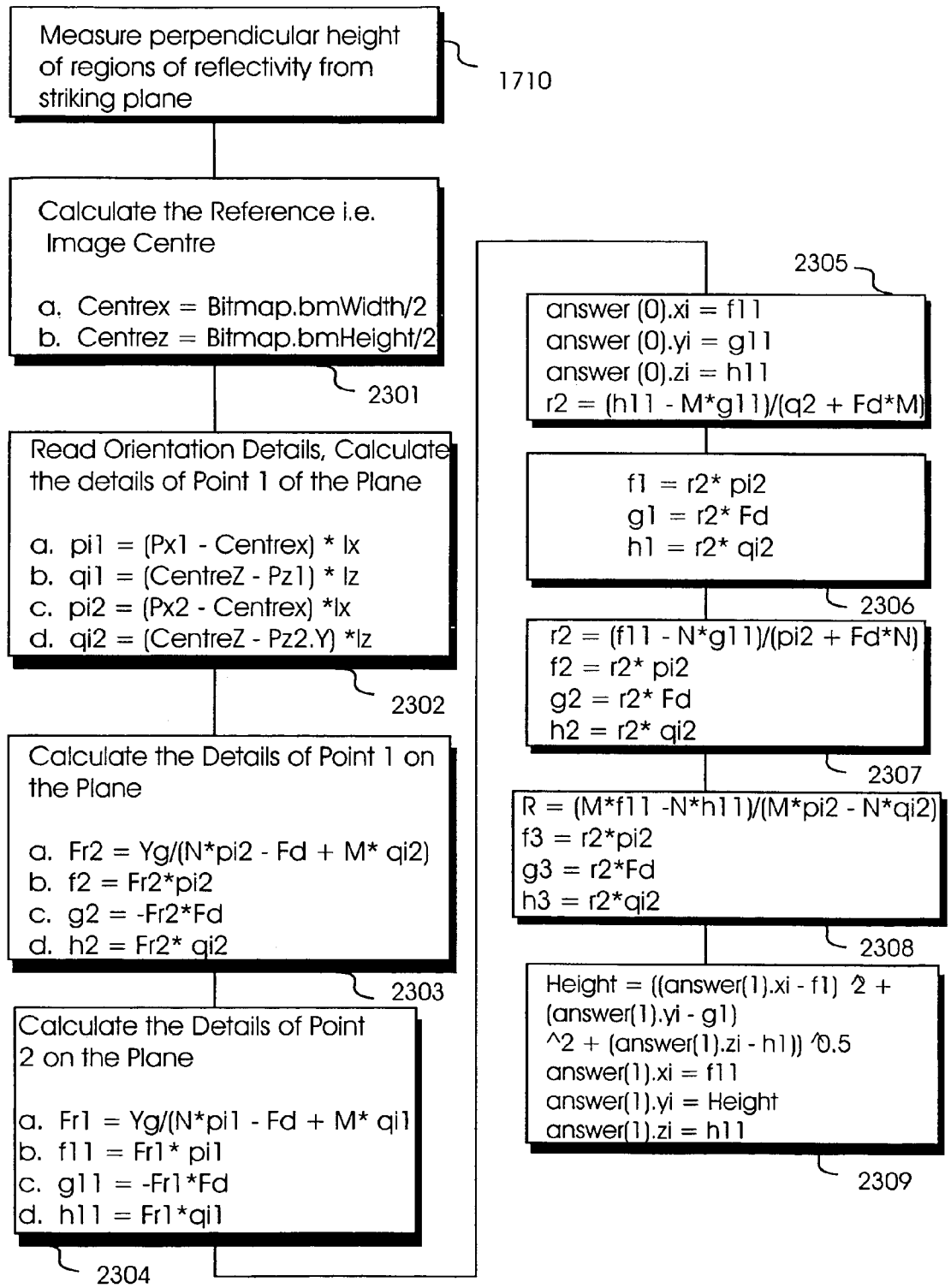
FIG. 23 illustrates schematically the method steps for determining the height measurement of a region of reflectivity in the imaged field of view from a striking plane.

Referring to FIG. 23 herein, the process steps for determining the perpendicular height of a region of reflectivity from a striking plane in the field of view are described. The centre of the image is calculated as a reference point 2301. The calculated orientation values and camera calibration values are retrieved and a determination of the x and z coordinates of a first region of reflectivity are calculated (2302, 2303). The coordinates of a second selected region of reflectivity are then determined 2304. These determinations are simultaneously solved (2305 to 2309) to determine the height of the first reference point from the striking plane.

Key to FIG. 23:

Px1=first selected point of interest in x;
Pz1=first selected point of interest in z;
Px2=second selected point of interest in x;
Pz2=second selected point of interest in z;
Ix=x pixel size;
Iz=z pixel size;
M represents tan (plane tilt);
N represents tan (plane pan);
Yg=centre axis intersection distance;
Fd=focal distance.

Figure 24:
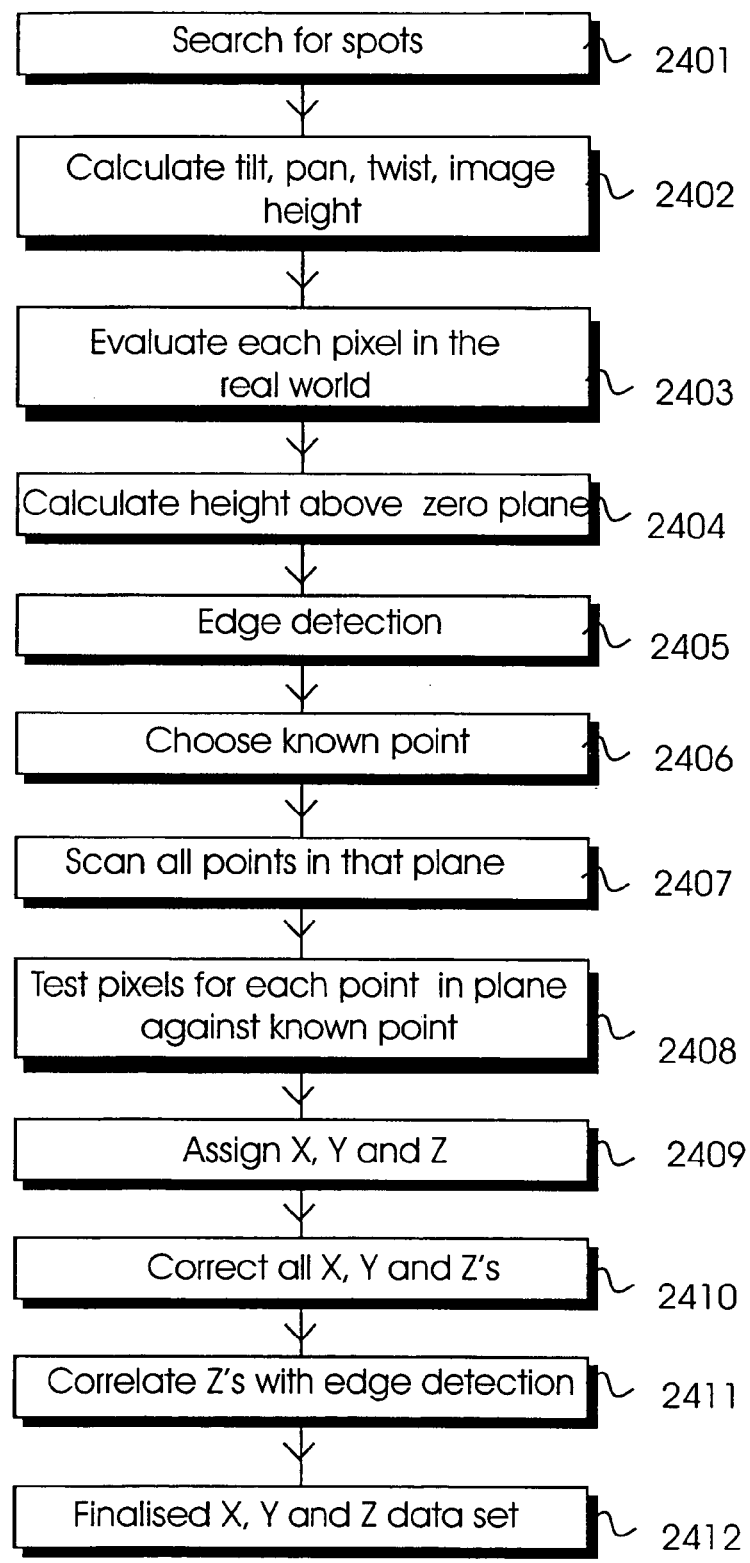
FIG. 24 illustrates schematically a summary of the determination of a set of three-dimensional positional data in accordance with the present invention.

The main steps in obtaining a three-dimensional positional data set of regions of reflectivity of a field of view starting with a captured two-dimensional image containing optical markers introduced to a field of view from a projection unit where a set of calibration values have been determined for the image plate and a set of beam characteristics for the projection unit are selected are summarized in FIG. 24. Referring to FIG. 24, a search is made throughout the captured two-dimensional image for each optical marker 2401 and the offset values are determined, a determination of the orientation values of tilt, pan, twist and height are made 2402. Each pixel is then evaluated in real world terms by establishing orientation values for each pixel 2403. A determination of height above a zero plane is made 2404. This may optionally be coupled with an edge detection performed throughout the captured two-dimensional image 2405. A known point (e.g. an optical marker) is then chosen 2406. From said known point the two-dimensional captured image is scanned to all points in a corresponding x, y or z plane 2407 and each pixel in the image is correlated in the same chosen plane against said known point 2408. Step 2408 is repeated for all planes to assign X, Y and Z in the real world to each pixel 2409. An error correction process is then carried out to correct for errors in each x, y and z axis 2310. The assigned z values are then optionally correlated with the results of the edge detection, the finalized data set of said co-ordinates 2411 are reintroduced to formulate a finalized three-dimensional positional data field set describing regions of reflectivity in the field of view of an image plate which has captured the two-dimensional image analyzed. This finalised data set can then be used to produce a virtual map/model in three-dimensions of the field of view.

Figure 25:
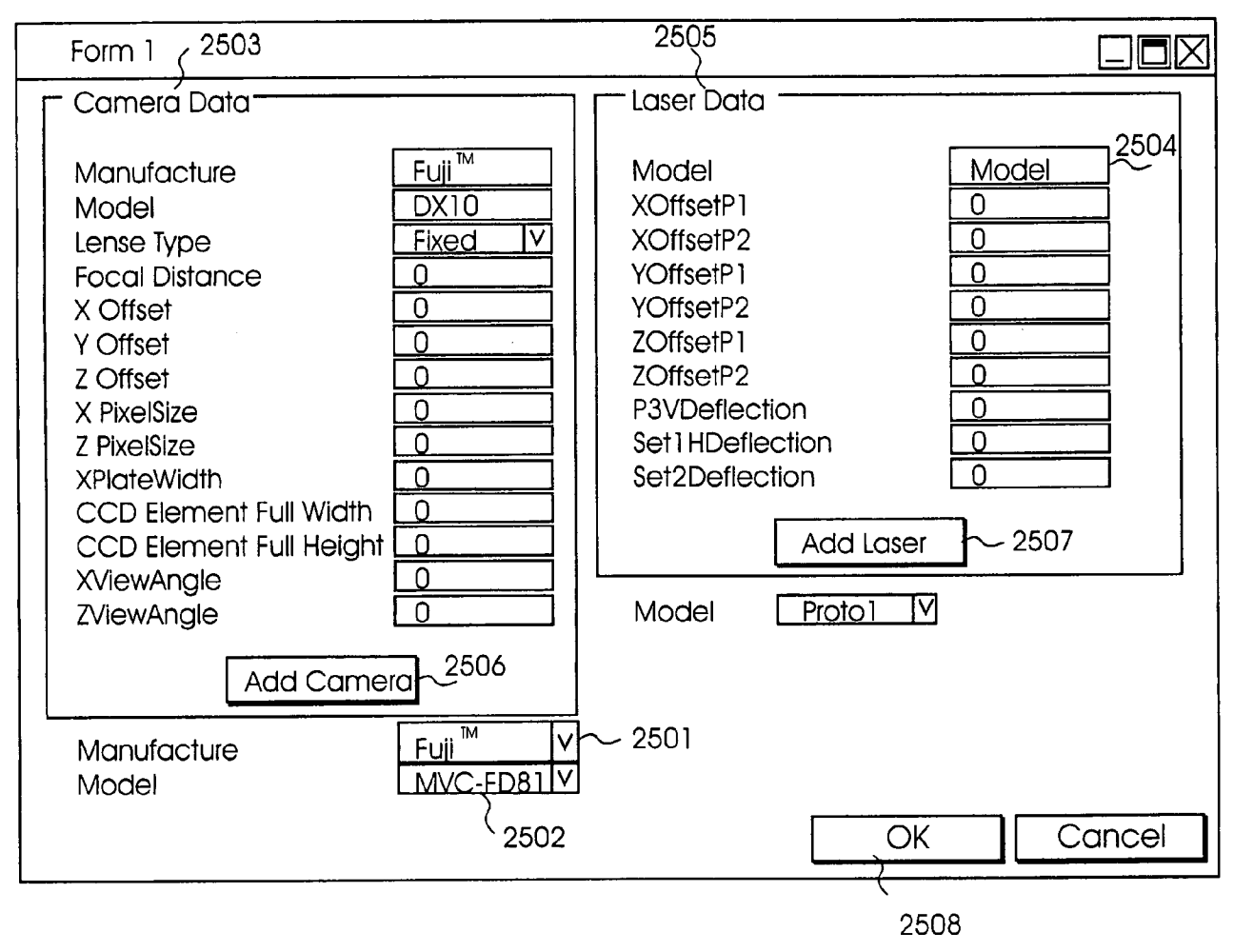

FIG. 25 illustrates a screen window of a software package for implementing the image analysis. The particular screen illustrated relates to the calibration values and beam configuration characteristics. Drop down menu 2501 provides the user with options to select one or more manufacturers of camera. The particular model can then be selected by selection of a serial number in drop down menu 2502. On the user selecting the correct manufacturer and model relating to the camera used to capture the image which is being analyzed, a set of previously determined calibration values is retrieved and displayed under the heading "Camera Data". Alternatively, an exif file relating to the particular model of camera used can be uploaded providing all of the camera data required. A selection of the projection unit model is also made enabling retrieval of a predetermined set of beam configuration characteristics for the projection unit which are displayed under the heading "Laser Data" 2505. New camera and projection unit data can be added via input screens accessed through links 2506 and 2507. Once the user has chosen the correct data, the data entry is confirmed 2508.

Whilst the invention has been described in terms of capturing an image with an image plate comprising a plurality of pixels each capable of generating a pixel of data it is possible to primarily capture an image of a field of view with a plurality of optical markers on a analogue type camera having a chemical based film format, said film format being of the type known in the prior art. A photographic image thereby obtained on hard copy e.g. paper can be transferred by means of a digital scanner into a data set comprising a plurality of pixels forming a two-dimensional image thereby digitally capturing the image. By obtaining a set of values relating the image plate to the projection unit used to obtain the image of the field of view and optical markers a set of orientation values can be ascertained to enable an image analysis as previously described to obtain a three-dimensional data set describing the three-dimensional positions of regions of reflectivity in the image captured.

In accordance with the image analysis described above the real world X, Y and Z distance to the centre of the striking plane imaged can be determined for a given x, z pixel on the image plate. Accordingly the real world X, Y and Z distances between two points in the field of view can be determined for a given orientation. The height of an object standing on the striking plane can thus be determined from the orientation of two pixels.

The present invention described above therefore enables a three-dimensional map of the regions of reflectivity in a field of view to be reconstructed from a two-dimensional image of that field of view captured on an image plate.

Each region of reflectivity corresponds to a point in the field of view from which light or other electromagnetic radiation is reflected. This reflected radiation can then be captured on the image plate. By obtaining positional data of these regions of reflectivity from a photographic image the ability to position accurately an object in the real world space from an image of that real world space is provided. Non-exhaustive examples of the applications of the present invention include the following:

Surveying/mapping—an image of a building, or other area to be mapped, is captured on an image plate comprising a number of pixels where the image includes optical markers projected from a projection unit to enable rapid three-dimensional modeling and mapping. A single photograph can be taken and then either analysed on site by means of downloading to a laptop or sent back to head office via email for further analysis. Such analysis typically takes currently between 2 to 4 minutes to produce a three-dimensional model and with increasing processor speeds an instantaneous or real time application for onsite mapping is possible.

Robotics—automated factory production lines commonly require positional data to locate one component with another. Where this is performed by automated robotic arms a rapid three-dimensional modeling is required to ensure proper location of components. Incorporating a camera into the robotic arms and an associated projection unit the required positional data can be determined in real time;

Security—the present invention has applications in tracking people and objects to monitor their location which includes security applications and monitoring of stock;

Marketing—the present invention also has applications in the recognizing of specific objects e.g. people, and may be applied to monitor the number of people moving through a space or attending a retail outlet and automatically log their movements;

Real time video image modeling—the present invention is also compatible with image capture on a digital video camera wherein a real time three-dimensional video image can be reconstructed.

A further example of the applications of the present invention are illustrated by a further embodiment as follows. The projection of markers into a field of view is not limited to projection of visible light markers but includes markers produced by electromagnetic radiation beams extending throughout the electromagnetic spectrum from $10^{-15}$ meters to $10^{-6}$ meters. A particular example is the use of x-ray beams. Here, an x-ray source takes the place of the laser diode and one or more electromagnetic lens means is configured to focus each electromagnetic beam. One or more beam splitters may be included to produce a required number of markers. An origin can be defined by the x-ray source or the lens. Considering the applications in the medical field. Projecting a plurality of electromagnetic beams towards a subject, e.g. a human body, with a back plate of lead, enables x-rays to be reflected from certain tissues through which the x-rays cannot penetrate or are x-ray opaque. Such tissues typically comprise bone. In this embodiment the range of wavelength of electromagnetic radiation being used to produce the markers projected into the field of view must be compatible with the image plate such that the image plate is sensitive to that wavelength of electromagnetic radiation. By projecting a minimum of 2 or 3 x-ray markers, a model of the human body bone structure can be built up. By the use of appropriate radiation sensitive image plate arrays, focusing means and electromagnetic radiation sources, the principles of the present invention can be applied to electromagnetic radiation throughout the electromagnetic spectrum.

Further potential uses of the present invention include thermal imaging using infra-red radiation and long distance mapping by the use of radio waves.

In a further embodiment of the present invention the inventors have understood the limits of utilizing a single imaging device. Any one imaging device has a maximum angle of view which determines the size of field of view. As a result, large fields cannot be captured in a single image. To overcome this problem and to reconstruct detailed three-dimensional positional data of large fields of view it is necessary to take more than one image. This concept is illustrated in FIGS. 26 and 27.

Figure 26:
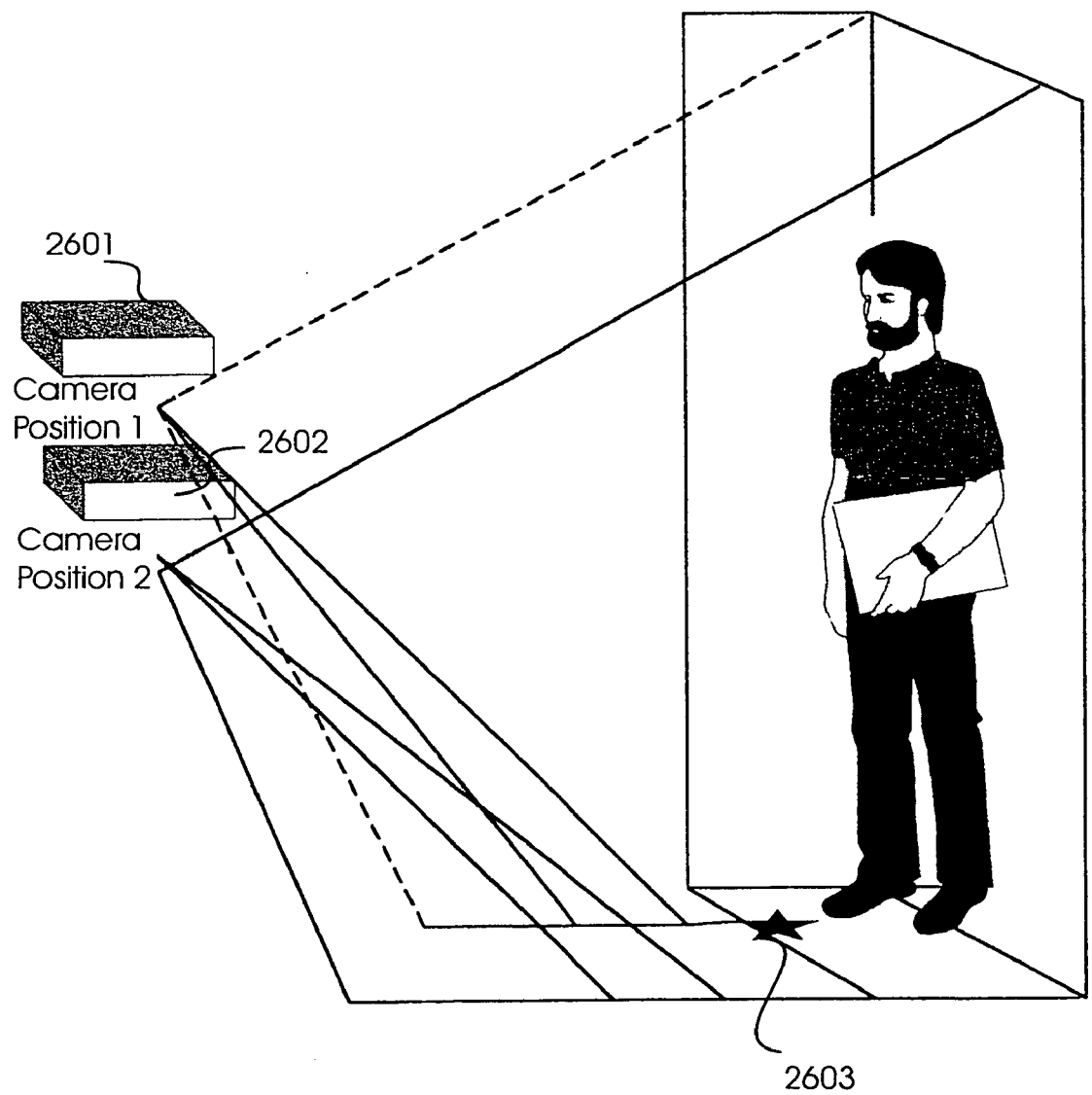
FIG. 26 illustrates diagrammatically a representation of the combination of captured images to cover a field of view larger than that in a single captured image.

Referring to FIG. 26, a first image is captured at position 2601 and a second image is captured at position 2602. Each of the first and second images include a common reference point 2603, which may be externally introduced, reconstruction of three-dimensional positional data is as described above. Having produced a three-dimensional data set the common reference point 2603 enables the two reconstructed images to be aligned to provide a model of the combined field of view. This principle can be further expanded by capturing a plurality of images all having at least one common reference point enabling data from those images to be coordinated to produce a single data set for the combined field of view.

Figure 27:
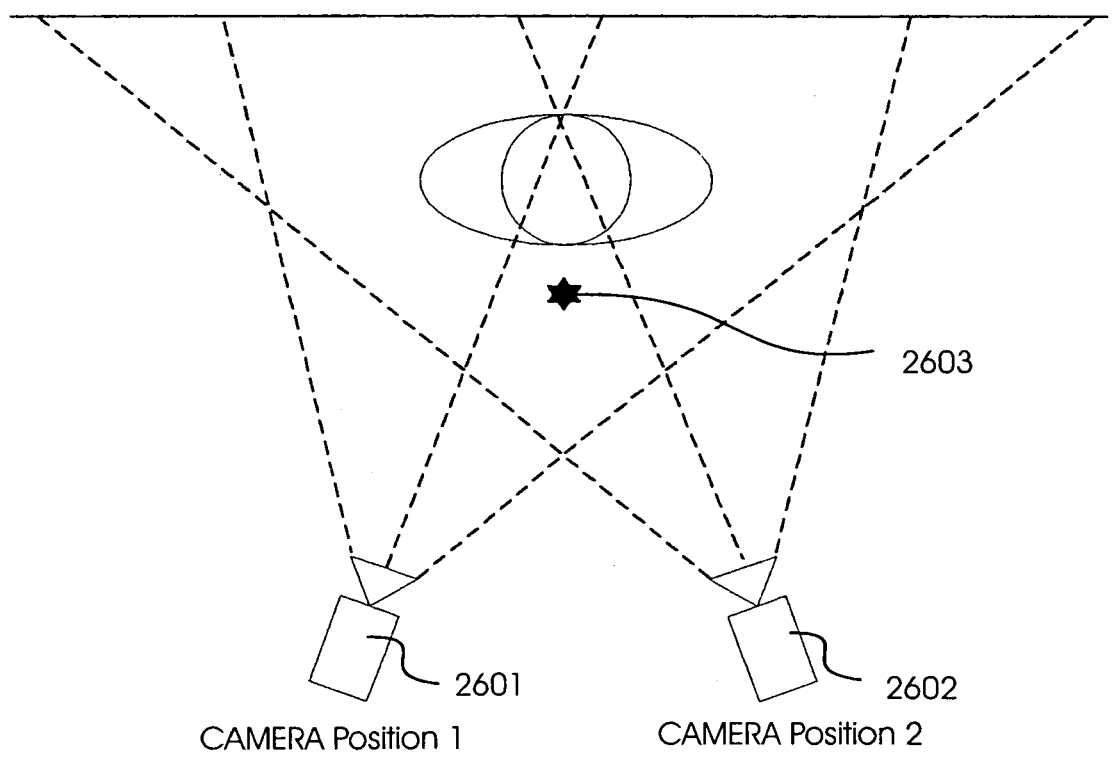
FIG. 27 illustrates a combination of imaging devices in stereovision arrangement for capturing an extended field of view or improving the accuracy of information obtained from an overlapping field of view.

FIG. 27 is an optical illustration of FIG. 26 illustrating first camera 2601 and second camera 2602 each capturing images comprising at least one common reference point 2603. Data obtained from each captured image can be combined to produce a common three-dimensional positional data set to map regions of reflectivity in the combined field of view.

Therefore by having a plurality of imaging devices, e.g. digital cameras or digital video cameras, each camera positioned to capture overlapping fields of view with at least one adjacent camera wherein common reference points can be determined in each overlapping field of view, an area larger than the field of view of a single camera can be mapped. By transmitting information between camera databases, movement of an object in a particular area may be anticipated

The invention claimed is:

1. A method of acquiring an image of a field of view whereby positional data are obtained for at least one region of reflectivity contained in said field of view, said field of view containing a plurality of said regions of reflectivity, said method comprising the steps of:

projecting into said field of view at least two detectable markers, each marker produced by emitting an electromagnetic beam incident on at least one reference plane comprised by said field of view, said reference plane comprising said at least one region of reflectivity, said beams each having an origin;

capturing an image of said field of view on an image plate, said image comprising said markers; and selecting a set of beam configuration characteristics, wherein at least one spatial relationship between at least one of the origins of said beams and said image plate at image capture, is determined, identifying said at least two markers in the captured image; and using said at least one spatial relationship to determine a set of offset values relating said image plate to said origin; and using the identification of said markers, said offset values, said selected beam configuration characteristics and trigonometric calculations to determine a set of orientation values describing the orientation of said image plate to each of selected regions of reflectivity in the field of view, said selected regions of reflectivity not being comprised by said reference plane.

2. A method as claimed in claim 1, wherein said beam configuration characteristics comprise at least one spatial separation between said origins.

3. A method as claimed in claim 1, wherein said beam configuration characteristics comprise at least one angular separation between beams projected from common or distinct origins.

4. A method as claimed in claim 1, wherein said beam configuration characteristics comprise at least one spatial separation between origins and at least one angular separation of beams projected from a common or distinct origin.

5. A method as claimed in claim 1, said method configured for the obtaining of said positional data in one, two or three-dimensions.

6. A method as claimed in claim 1, said method further comprising the step of:
   using said orientation values to reconstruct a positional data set describing the position of at least one said selected region of reflectivity.

7. A method as claimed in claim 6, wherein said step of using said orientation values to reconstruct a positional data set describing the position of at least one said selected region of reflectivity comprises the steps of:
   using said orientation values to evaluate each pixel of data in the real world by determining the degree of pan and/or twist and/or tilt for each pixel of data; and
   associating each said pixel of data with a said selected region of reflectivity and determining the real world position of said selected region of reflectivity.

8. A method as claimed in claim 6, wherein said step of using said orientation values to reconstruct a positional data set describing the position of at least one said selected region of reflectivity comprises the steps of:
   using said orientation values to evaluate each pixel of data in the real world by determining the degree of pan and/or twist and/or tilt for each pixel of data; and
   associating each said pixel of data with a said selected region of reflectivity and determining the real world position of said selected region of reflectivity; and
   repeating said evaluation of each pixel of data for a plurality of heights above a striking plane.

9. A method as claimed in claim 6 wherein said step of using said orientation values to reconstruct a positional data set describing the position of at least one said selected region of reflectivity comprises the steps of:
   using said orientation values to evaluate each pixel of data in the real world by determining the degree of pan and/or twist and/or tilt for each pixel of data; and
   associating each said pixel of data with a said selected region of reflectivity and determining the real world position of said selected region of reflectivity; and
   selecting a pixel of data representing a said selected region of reflectivity having known three dimensional positional data and scanning to all three-dimensional planes to test tht each pixel of data matches a set of three dimensional coordinates.

10. A method as claimed in claim 6, wherein said step of using said orientation values to reconstruct a positional data set describing the position of at least one said selected region of reflectivity comprises the steps of:
    using said orientation values to evaluate each pixel of data in the real world by determining the degree of pan and/or twist and/or tilt for each pixel of data; and
    associating each said pixel of data with a said selected region of reflectivity and determining the real world position of said selected region of reflectivity; and
    said step of using said orientation values to reconstruct a positional data set comprises the step of reconstructing a three-dimensional data set describing the three-dimensional position of said selected regions of reflectivity, said step comprising the steps of:
    applying an edge detection function to the two-dimensional captured image; and
    checking the three-dimensional data describing said selected regions of reflectivity against the edge detection results to establish a finalised set of three-dimensional data describing the three dimensional real world position of each said selected region of reflectivity.

11. A method as claimed in claim 1, wherein said orientation values comprise a pan of said image plate with respect to said selected region of reflectivity, a pan defined as rotation about the z axis.

12. A method as claimed in claim 1, wherein said orientation values comprise a twist of said image plate with respect to said selected region of reflectivity, a twist defined as rotation about the y axis.

13. A method as claimed in claim 1, wherein said orientation values comprise a tilt of said image plate with respect to a said selected region of reflectivity, a tilt defined as rotation about the x axis.

14. A method as claimed in claim 1, wherein said orientation values comprise a height of said image plate with respect to a said selected region of reflectivity.

15. A method as claimed in claim 1, wherein said step of identifying at least two markers in the captured image comprises the steps of:
    searching for said markers in the captured image to obtain a first set of identified markers; and
    filtering said first set of identified markers to remove false markers.

16. A method as claimed in claim 15, said method comprising the step of:
    determining the position of said markers in the image by implementing a best fit analysis.

17. A method as claimed in claim 1, wherein said step of determining a set of offset values comprises the step of:
    determining a set of offset coefficients, each offset coefficient describing a function of the image plate—origin spatial relationships.

18. A method as claimed in claim 17, wherein said step of determining a set of offset values further comprises the step of:
    calculating an angular mounting error of the image plate in relation to the origin of each beam.

19. The method as claimed in claim 1, said method further comprising the steps of:
    using said orientation values to determine a distance from said image plate to each said selected region of reflectivity.

20. A method as claimed in claim 1, wherein said method further comprises the step of:
    using respective said orientation values to determine the perpendicular height difference between a said selected region of reflectivity and a striking plane.

21. A method as claimed in claim 1 wherein said image plate comprises an array of elements each capable of generating a pixel of data.

22. A method as claimed in claim 21, wherein said image plate comprises a CCD or CMOS array.

23. A method as claimed in claim 1, wherein said step of identifying said markers in the captured image comprises the step of:
    conducting a search of the captured two-dimensional image to identify pixels receiving reflected radiation of a particular wavelength.

24. A method as claimed in claim 1, said method further comprising the step of:
    mapping three-dimensional positional data obtained to reconstruct a virtual three-dimensional representation of the field of view.

25. A method as claimed in claim 1, wherein said at least two detectable markers comprise at least one first marker projected from a first origin and at least one second marker projected from a second origin.

26. A method as claimed in claim 1, wherein two said markers are projected into said field of view, each marker projected from a distinct origin, said markers intersected by the optical axis of said image plate, said beam configuration characteristics comprising the spatial separation of each origin to the image plate centre.

27. A method as claimed in claim 1, wherein at least three said markers are projected into said field of view, each marker projected from a distinct origin, said beam configuration characteristics comprising the spatial separation between each origin.

28. A method as claimed in claim 1, wherein at least three said markers are projected into said field of view, at least one marker projected from a first origin and at least two said markers projected from a second common origin, said beam configuration characteristics comprising at least one spatial separation between said origins and an angular separation of the beams projected from said second common origin.

29. A method of acquiring an image of a field of view, said method comprising the distance between at least one region of reflectivity contained in a field of view and an image plate, said method comprising the steps of:
projecting into said field of view at least one detectable marker said marker produced by emitting at least one electromagnetic beam incident on at least one reference plane comprised by said field of view, said reference plane comprising at least one region of reflectivity, said beam having an origin;
capturing an image of said field of view on an image plate, said image comprising said markers; and
selecting a set of beam configuration characteristics,
wherein at least one spatial relationship between said origins of said beam and said image plate, at image capture, is determined,
identifying said marker in the captured image; and
using said at least one spatial relationship to determine a set of offset values relating said image plate to said origins; and
using the identification of said marker, said offset values, said selected beam configuration characteristics and trigonometric calculations to determine a set of orientation values describing the orientation of said image plate to each of selected regions of reflectivity in the field of view, said selected region of reflectivity not being comprised by said reference plane.

30. A method as claimed in claim 29, further comprising the step of
using said orientation values to determine the distance between said image plate and one or more of said selected regions of reflectivity.

31. A method as claimed in claim 29, wherein said image plate comprises an array of elements each capable of generating a pixel of data.

32. A method of acquiring and processing an image of a field of view to obtain positional data describing the real world position of at least one region of reflectivity contained in the image, said image comprising a representation of said field of view into which at least two detectable markers have been projected, each marker produced by incidence of at least one electromagnetic beam on at least one reference plane in said field of view, said reference plane comprising at least one region of reflectivity in the imaged field of view, said beams each having an origin said method comprising the steps of:

selecting a set of beam configuration characteristics;
determining at least one spatial relationship between the origin of each said beam and the image plate at image capture;
identifying said at least two markers in the captured image; and
using said at least one spatial relationship to determine a set of offset values relating said image plate to each said origin(s); and
using the identification of said markers, said offset values, said selected beam configuration characteristics and trigonometric calculations to determine a set of orientation values describing the orientation of said image plate to each of selected regions of reflectivity in the field of view, said selected regions of reflectivity not being comprised by said reference plane.

33. A method imaging a field of view for use in obtaining positional data describing the real world position of at least one region of reflectivity contained in said field of view, wherein said field of view contains a plurality of regions of reflectivity, said method comprising the steps of:
projecting into said field of view at least two detectable markers, each marker produced by emitting at least one electromagnetic beam incident on at least one reference plane comprised by said field of view, said reference plane comprising at least one region of reflectivity, said beams having at least one origin; and
capturing an image of said field of view on an image plate, said image comprising said markers,
wherein said image plate and said origins are arranged in fixed positions relative to each other at image capture, wherein by selecting a set of beam configuration characteristics an analysis of the captured image can be performed comprising the identification of the markers in the image, the determination of a set of offset values relating the image plate to said at least one origin and using the identified markers, offset values, selected beam configuration characteristics and trigonometric calculations to determine a set of orientation values describing the orientation of the image plate to each of selected regions of reflectivity in the field of view, said selected regions of reflectivity not being comprised by said reference plane.

34. An apparatus for acquiring an image of a field of view. Said apparatus configured to project at least first and second detectable markers onto said field of view, wherein said markers are captured as part of said obtained image of said field of view formed on an image plate, said apparatus comprising:
at least one electromagnetic radiation source configured for emission of electromagnetic radiation;
beam producing means configured to operate on said electromagnetic radiation to produce at least two electromagnetic beams, each beam having an origin, said beams producing said detectable markers on incidence with a reference plane comprising a region of reflectivity in said field of view; and
location means to locate an image plate, said location means located at a pre-determined position,
wherein:
the angular projection of each said beam from each respective origin and the positions of each said origin within said unit are pre-determined, such that the spatial relationship between said origins and/or said origins and said means to locate an image plate are thereby also pre-determined; and said projected beams are configured to project said markers onto said field of view to provide information for the analysis of an image of said field of view and said markers captured at said image plate in order to establish a set of orientation values describing the orientation of the image plate, at image capture, to selected regions of reflectivity in said field of view, said selected regions of reflectivity not being comprised by said reference plane.

35. An apparatus as claimed in claim 34, wherein said markers form a predefined pattern in said field of view.

36. An apparatus as claimed in claim 34, wherein said electromagnetic radiation comprises radiation of a wavelength in the range $10^{-15}$ m to $10^{-6}$ m.

37. An apparatus as claimed in claim 34, wherein said image plate comprises a CCD or CMOS array.

38. An apparatus as claimed in claim 34, wherein said image plate is comprised by a digital camera, said means to locate said image plate configured to engage said digital camera for the location of said digital camera in fixed spatial and angular orientation on said projection unit.

39. An apparatus as claimed in claim 34, wherein said electromagnetic radiation comprises visible light of a wavelength in the range 400 nm to 700 nm.

40. An apparatus as claimed in claim 34, wherein said projection unit further comprises a body portion, said body portion defining a fixed location of said origins and a fixed location of said means to locate said image plate.

41. An apparatus as claimed in claim 34, wherein said orientation values enable the reconstruction of a positional data set describing the real world position of said selected regions of reflectivity in said field of view in one, two or three-dimensions.

42. An apparatus as claimed in claim 34, wherein said projection unit further comprises means to focus said beams.

* * * * *